United States Patent
Reichardt et al.

(10) Patent No.: US 10,329,978 B1
(45) Date of Patent: Jun. 25, 2019

(54) HIGH TEMPERATURE EXHAUST SYSTEMS FOR MARINE PROPULSION DEVICES

(71) Applicant: Brunswick Corporation, Mettawa, IL (US)

(72) Inventors: Douglas D. Reichardt, West Bend, WI (US); Mark J. Glodowski, De Pere, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/895,260

(22) Filed: Feb. 13, 2018

(51) Int. Cl.
| | |
|---|---|
| *F01N 13/12* | (2010.01) |
| *F01N 3/04* | (2006.01) |
| *F01N 13/00* | (2010.01) |
| *F02B 61/04* | (2006.01) |
| *F02B 75/22* | (2006.01) |

(52) U.S. Cl.
CPC .......... *F01N 3/046* (2013.01); *F01N 13/004* (2013.01); *F01N 13/12* (2013.01); *F02B 61/045* (2013.01); *F01N 2590/021* (2013.01); *F02B 75/22* (2013.01)

(58) Field of Classification Search
CPC .......... F01N 3/046; F01N 13/04; F01N 13/12; F02B 61/045
See application file for complete search history.

(56) References Cited

U.S. PATENT DOCUMENTS

| | | | |
|---|---|---|---|
| 1,862,723 A | 6/1932 | Summers | |
| 2,305,295 A | 10/1940 | Lang et al. | |
| 2,318,006 A | 5/1943 | Mercier | |
| 2,388,924 A | 11/1945 | Mercier | |
| 3,768,248 A | 10/1973 | Grgurich et al. | |

(Continued)

FOREIGN PATENT DOCUMENTS

| | | |
|---|---|---|
| CA | 1285883 | 7/1991 |
| DE | 664031 | 10/1938 |

(Continued)

OTHER PUBLICATIONS

Mercury Marine Service Manual: Models 175XR2 Sport Jet. Mercury Marine; Nov. 1997.

(Continued)

*Primary Examiner* — Stephen P Avila
(74) *Attorney, Agent, or Firm* — Andrus Intellectual Property Law, LLP

(57) ABSTRACT

An exhaust system for a marine propulsion device having an engine and a driveshaft housing. An exhaust manifold having a downstream end with an outer surface conveys exhaust gas from the engine. An exhaust conduit having an upstream end with an outer surface conveys the exhaust gas to the driveshaft housing. A flexible coupler couples the downstream end of the exhaust manifold and the upstream end of the exhaust conduit, retaining a gap between them. A metallic coil is aligned with the flexible coupler, which biases the metallic coil into contact with the outer surfaces of the exhaust manifold and the exhaust conduit to conduct heat between them. First and second clamps engage outer surfaces of the flexible coupler to cause inner surfaces of the flexible coupler to sealingly engage the outer surface of the exhaust manifold, and the outer surface of the exhaust conduit, respectively.

15 Claims, 25 Drawing Sheets

(56) References Cited

U.S. PATENT DOCUMENTS

| | | | |
|---|---|---|---|
| 3,898,802 A | 8/1975 | Takokoro et al. |
| 3,994,129 A | 11/1976 | Sakurai et al. |
| 4,082,068 A | 4/1978 | Hale |
| 4,188,784 A | 2/1980 | Hall |
| 4,342,462 A * | 8/1982 | Carlesimo | E03F 5/021 |
| | | | 277/606 |
| 4,346,676 A | 8/1982 | Tyner |
| 4,709,948 A | 12/1987 | Archer et al. |
| 4,732,412 A | 3/1988 | van der Linden et al. |
| 4,932,367 A | 6/1990 | Newman et al. |
| 4,965,997 A | 10/1990 | Suzuki et al. |
| 5,003,934 A | 4/1991 | Gubon et al. |
| 5,012,648 A | 5/1991 | Okumura |
| 5,337,706 A | 8/1994 | De Blasis |
| 5,346,417 A | 9/1994 | Isogawa |
| 5,374,209 A | 12/1994 | Wagner |
| 5,378,180 A | 1/1995 | Nakayama et al. |
| 5,463,990 A | 11/1995 | Rush, II et al. |
| 5,476,402 A | 12/1995 | Nakai et al. |
| 5,494,467 A | 2/1996 | Sohgawa et al. |
| 5,513,606 A | 5/1996 | Shibata |
| 5,553,586 A | 9/1996 | Koishikawa et al. |
| 5,556,311 A | 9/1996 | Fujimoto |
| 5,673,655 A | 10/1997 | Mishima |
| 5,762,051 A | 6/1998 | Okamoto |
| 5,778,833 A | 7/1998 | Kuranishi |
| 5,778,847 A | 7/1998 | Takahashi et al. |
| 5,820,426 A | 10/1998 | Hale |
| 5,822,985 A | 10/1998 | Yoshimura |
| 5,822,986 A | 10/1998 | Higashide |
| 5,855,495 A | 1/1999 | Kubo |
| 5,881,553 A | 3/1999 | Steenackers et al. |
| 5,887,907 A | 3/1999 | Kubota et al. |
| 5,893,783 A | 4/1999 | Hiraoka et al. |
| 5,911,605 A | 6/1999 | Wooldridge et al. |
| 5,911,608 A | 6/1999 | Nakayama et al. |
| 6,053,786 A | 4/2000 | Mishima et al. |
| 6,213,074 B1 | 4/2001 | Freese |
| 6,220,605 B1 | 4/2001 | Becker, Jr. |
| 6,298,815 B1 | 10/2001 | Kashima et al. |
| 6,302,754 B1 | 10/2001 | Kashima |
| 6,338,660 B1 | 1/2002 | Fukuda |
| 6,461,208 B2 | 10/2002 | Suzuki et al. |
| 6,543,429 B2 | 4/2003 | Osakabe et al. |
| 6,622,481 B2 | 9/2003 | Ruman et al. |
| 6,662,555 B1 | 12/2003 | Ishii |
| 6,722,126 B2 | 4/2004 | Kawamizu |
| 7,001,231 B1 | 2/2006 | Halley et al. |
| 7,043,915 B2 | 5/2006 | Anello |
| 7,115,009 B2 | 10/2006 | Itoh et al. |
| 7,162,985 B2 | 1/2007 | Itoh et al. |
| 7,214,110 B1 | 5/2007 | Ehlers et al. |
| 7,361,067 B1 | 4/2008 | Smedema |
| 7,377,251 B2 | 5/2008 | Wizgall et al. |
| 7,451,734 B2 | 11/2008 | Weber |
| 7,704,111 B2 | 4/2010 | Ito et al. |
| 7,731,241 B2 | 6/2010 | Aoki et al. |
| 7,837,233 B2 | 11/2010 | Johnston et al. |
| 7,867,048 B2 | 1/2011 | Ochiai |
| 7,895,992 B2 | 3/2011 | Diggs et al. |
| 7,930,883 B2 | 4/2011 | Konakawa et al. |
| 7,954,314 B1 | 6/2011 | Bruestle et al. |
| 8,002,597 B2 | 8/2011 | Ochiai |
| 8,266,906 B2 | 9/2012 | Wu et al. |
| 8,366,501 B2 | 2/2013 | Kazuta |
| 8,500,501 B1 | 8/2013 | Taylor et al. |
| 8,540,536 B1 | 9/2013 | Eichinger et al. |
| 8,668,538 B1 | 3/2014 | Langenfeld et al. |
| 8,801,482 B2 | 8/2014 | Ochiai et al. |
| 8,858,283 B2 | 10/2014 | Ochiai et al. |
| 8,978,372 B2 | 3/2015 | Ochiai et al. |
| 9,120,549 B2 | 9/2015 | Ochiai et al. |
| 9,174,818 B1 | 11/2015 | Langenfeld et al. |
| 9,365,275 B1 | 6/2016 | Habeck et al. |
| 9,616,987 B1 | 4/2017 | Langenfeld et al. |
| 9,752,711 B2 | 9/2017 | Knapp |
| 2002/0017252 A1 | 2/2002 | Onoue |
| 2003/0051683 A1 | 3/2003 | Okamoto |
| 2004/0142612 A1 | 7/2004 | Tawa et al. |
| 2004/0203299 A1 | 10/2004 | Kashima et al. |
| 2005/0263123 A1 | 12/2005 | Itoh et al. |
| 2006/0144369 A1 | 7/2006 | Takahashi et al. |
| 2007/0056281 A1 | 3/2007 | Arvan et al. |
| 2009/0007550 A1 | 1/2009 | Konakawa et al. |
| 2009/0078240 A1 | 3/2009 | Diggs et al. |
| 2009/0094965 A1 | 4/2009 | Takewaki |
| 2009/0215333 A1 | 8/2009 | Ochiai |
| 2010/0130079 A1 | 5/2010 | White et al. |
| 2010/0240269 A1 | 9/2010 | Ochiai |
| 2010/0242450 A1 | 9/2010 | Werni et al. |
| 2011/0223819 A1 | 9/2011 | Kazuta |
| 2013/0130577 A1 | 5/2013 | Ochiai et al. |
| 2013/0210295 A1 | 8/2013 | Davis et al. |
| 2014/0284914 A1 | 9/2014 | Tsambarlis |
| 2016/0114878 A1 * | 4/2016 | Hubbard, Jr. | B63H 11/113 |
| | | | 440/39 |
| 2017/0307109 A1 * | 10/2017 | McCarter | F16L 3/16 |

FOREIGN PATENT DOCUMENTS

| | | |
|---|---|---|
| DE | 2344864 | 4/1975 |
| DE | 2449753 | 4/1976 |
| DE | 3150001 | 6/1983 |
| DE | 3631312 | 7/1987 |
| DE | 4030652 | 4/1992 |
| DE | 4042415 | 11/1992 |
| DE | 4136799 | 5/1993 |
| DE | 19736500 | 12/1998 |
| DE | 69823516 | 4/2005 |
| DE | 202005019046 | 3/2006 |
| DE | 102004060845 | 6/2006 |
| DE | 102006043864 | 6/2007 |
| DE | 202008010025 | 11/2008 |
| DE | 102010034953 | 6/2011 |
| DE | 102011001195 | 9/2011 |
| DE | 102010015679 | 10/2011 |
| EP | 0685637 | 12/1999 |
| EP | 1069301 | 1/2001 |
| FR | 651848 | 2/1929 |
| GB | 436058 | 10/1935 |
| GB | 618518 | 2/1940 |
| GB | 674532 | 6/1952 |
| GB | 915230 | 1/1963 |
| JP | 5699005 | 12/1954 |
| JP | 55010043 | 1/1980 |
| JP | 06-146876 | 5/1994 |
| JP | 06146876 | 5/1994 |
| JP | 1994264757 | 9/1994 |
| JP | 1997317464 | 12/1997 |
| JP | 2000356123 | 12/2000 |
| JP | 2001140636 | 5/2001 |
| JP | 200297948 | 4/2002 |
| JP | 2002097948 | 4/2002 |
| JP | 2003286842 | 10/2003 |
| JP | 200460557 | 2/2004 |
| JP | 2004293404 | 10/2004 |
| JP | 2005188351 | 7/2005 |
| JP | 2005188352 | 7/2005 |
| JP | 2006170020 | 6/2006 |
| JP | 2008031868 | 2/2008 |
| JP | 2008031897 | 2/2008 |
| JP | 2008031898 | 2/2008 |
| JP | 2009002265 | 1/2009 |
| JP | 4329396 | 9/2009 |
| JP | 2010242744 | 10/2010 |

(56) References Cited

FOREIGN PATENT DOCUMENTS

| JP | 2011190704 | 9/2011 |
| JP | 2011202578 | 10/2011 |
| WO | 1989004421 | 5/1989 |

OTHER PUBLICATIONS

Norma Pacific, Benefits of NORMACONNECT® Pipe Couplings, http://www.normaamericadsds.com/sites/default/files/product_pdfs/Normaconnect%20RepRep%20E.pdf, date of visit Feb. 1, 2018.

Grip-m Nbr Flexible and Multifunctional Pipe Joining Coupling with Steep Strip Insert Option, https://www.alibaba.com/product-detail/GRIP-M-NVR-Flexible-and-Multinational_60508104098.html, date of visit Feb. 1, 2018.

Google Image Result for https://i.ytimg.com/vi/m660Dv0M_qc/maxresdefault.jpg, dated of visit Feb. 1, 2018.

Grainger Approved AWWA Coupling, 5 in L- - 5ENH5I46103460421000—Granger, https://www.grainger.com/product/5ENH5?cm_mmc=PPC:+Google+PLA&s_kwcid=AL!2966!3!166588805278!!!s!28168837!&ef_id=U9gKpwAAAB, date of visit Feb. 1, 2018.

\* cited by examiner

HIGH TEMPERATURE EXHAUST SYSTEMS FOR MARINE PROPULSION DEVICES

FIELD

The present disclosure relates to exhaust systems for marine propulsion devices, and particularly to exhaust systems for marine propulsion devices configured to withstand high temperatures.

BACKGROUND

The following U.S. Patents are incorporated herein by reference:

U.S. Pat. No. 9,616,987 discloses a marine engine having a cylinder block with first and second banks of cylinders disposed along a longitudinal axis and extending transversely with respect to each other in a V-shape so as to define a valley there between. A catalyst receptacle is disposed at least partially in the valley and contains at least one catalyst that treats exhaust gas from the marine engine. A conduit conveys the exhaust gas from the marine engine to the catalyst receptacle. The conduit receives the exhaust gas from the first and second banks of cylinders and conveys the exhaust gas to the catalyst receptacle. The conduit reverses direction only once with respect to the longitudinal axis.

U.S. Pat. No. 9,365,275 discloses an outboard marine propulsion device having an internal combustion engine with a cylinder head and a cylinder block, and an exhaust manifold that discharges exhaust gases from the engine towards a catalyst housing. The exhaust manifold has a plurality of horizontally extending inlet runners that receive the exhaust gases from the engine and a vertically-extending collecting passage that conveys the exhaust gases from the plurality of horizontally-extending inlet runners to a bend that redirects the exhaust gases downwardly towards the catalyst housing.

U.S. Pat. No. 9,174,818 discloses a marine engine having a cylinder block with first and second banks of cylinders that are disposed along a longitudinal axis and extend transversely with respect to each other in a V-shape so as to define a valley there between. A catalyst receptacle is disposed at least partially in the valley and contains at least one catalyst that treats exhaust gas from the marine engine. A conduit conveys the exhaust gas from the marine engine to the catalyst receptacle. The conduit receives the exhaust gas from the first and second banks of cylinders and conveys the exhaust gas to the catalyst receptacle. The conduit reverses direction only once with respect to the longitudinal axis.

U.S. Pat. No. 8,668,538 discloses a marine engine having an exhaust system comprising a cylinder block comprising first and second banks of cylinders that are disposed along a longitudinal axis and that extend transversely with respect to each other in a V-shape so as to define a valley there between. A catalyst receptacle is disposed in the valley and contains at least one catalyst that treats exhaust gas from the marine engine. An exhaust manifold conveys exhaust gas from the marine engine to the catalyst receptacle. The exhaust manifold has a first port receiving exhaust gas from the first bank of cylinders, a second port receiving exhaust gas from the second bank of cylinders, and a conduit conveying the exhaust gas from the first and second ports to the catalyst receptacle, wherein from the first and second ports to the catalyst receptacle, the conduit only reverses direction once with respect to the longitudinal axis.

U.S. Pat. No. 8,540,536 discloses a cooling system for a marine engine having an exhaust manifold with a first end receiving hot exhaust gas from the marine engine and a second end discharging the exhaust gas, and an elongated cooling water jacket extending adjacent to the exhaust manifold. The cooling water jacket receives raw cooling water at a location proximate to the second end of the exhaust manifold, conveys raw cooling water adjacent to the exhaust manifold to thereby cool the exhaust manifold and warm the raw cooling water, and thereafter discharges the warmed cooling water to cool the internal combustion engine.

U.S. Pat. No. 8,500,501 discloses an outboard marine drive including a cooling system drawing cooling water from a body of water in which the outboard marine drive is operating and supplying the cooling water through cooling passages in an exhaust tube in the driveshaft housing, a catalyst housing, and an exhaust manifold, and thereafter through cooling passages in the cylinder head and the cylinder block of the engine. A 3-pass exhaust manifold is provided. A method is provided for preventing condensate formation in a cylinder head, catalyst housing, and exhaust manifold of an internal combustion engine of a powerhead in an outboard marine drive.

U.S. Pat. No. 7,001,231 discloses a water cooling system for an outboard motor having a water conduit that extends through both an idle exhaust relief passage and a primary exhaust passage. Water within the water conduit flows through first and second openings to distribute sprays or streams of water into first and second exhaust manifolds, which can be the primary and idle exhaust relief passages of an outboard motor.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter. Various other features, objects, and advantages of the invention will be made apparent from the following description taken together with the drawings.

In the illustrated examples, an exhaust system for a marine propulsion device that includes an internal combustion engine and a driveshaft housing. The exhaust system includes an exhaust manifold that conveys exhaust gas from the internal combustion engine, where the exhaust manifold has a downstream end with an outer surface. An exhaust conduit conveys the exhaust gas between the exhaust manifold and the driveshaft housing, where the exhaust conduit has an upstream end with an outer surface. A flexible coupler has an outer surface and an inner surface and the flexible coupler couples the downstream end of the exhaust manifold and the upstream end of the exhaust conduit such that a gap is retained therebetween. A metallic coil is coaxially aligned with the flexible coupler, wherein the flexible coupler biases the metallic coil into contact with both the outer surface of the exhaust manifold and the outer surface of the exhaust conduit. A first clamp engages the outer surface of the flexible coupler such that the inner surface of the flexible coupler sealingly engages with the outer surface of the exhaust manifold. A second clamp engages the outer surface of the flexible coupler such that the inner surface of the flexible coupler sealingly engages with the outer surface of the exhaust conduit. The metallic coil is configured such that when in contact with both the outer surface of the exhaust manifold and the outer surface of the exhaust conduct, the metallic coil shields the flexible coupler from the exhaust gas and also conducts heat between the exhaust manifold and the exhaust conduit.

Another example relates to an exhaust system for a marine propulsion device having an internal combustion engine and a driveshaft housing. The exhaust system includes an exhaust manifold that conveys exhaust gas from the internal combustion engine. The exhaust manifold has a downstream end with an outer surface. A first exhaust conduit conveys the exhaust gas from the exhaust manifold, where the first exhaust conduit has an upstream end and a downstream end each having an outer surface. A first flexible coupler has an outer surface and an inner surface and couples the downstream end of the exhaust manifold and the upstream end of the first exhaust conduit such that a gap is retained therebetween. A first metallic coil is coaxially aligned with the first flexible coupler, which biases the first metallic coil into contact with both the outer surface of the exhaust manifold and the outer surface of the first exhaust conduit. A first clamp engages the outer surface of the first flexible coupler such that the inner surface of the first flexible coupler sealingly engages with the outer surface of the exhaust manifold. A second clamp engages the outer surface of the first flexible coupler such that the inner surface of the first flexible coupler sealingly engages with the outer surface of the first exhaust conduit. A second exhaust conduit conveys the exhaust gas between the first exhaust conduit and the driveshaft housing, where the second exhaust conduit has an upstream end with an outer surface. A second flexible coupler has an outer surface and an inner surface and couples the downstream end of the first exhaust conduit and the upstream end of the second exhaust conduit such that a gap is retained therebetween. A second metallic coil is coaxially aligned with the second flexible coupler, which biases the second metallic coil into contact with both the outer surface of the first exhaust conduit and the outer surface of the second exhaust conduit. A third clamp engages the outer surface of the second flexible coupler such that the inner surface of the second flexible coupler sealingly engages with the outer surface of the first exhaust conduit. A fourth clamp engages the outer surface of the second flexible coupler such that the inner surface of the second flexible coupler sealingly engages with the outer surface of the second exhaust conduit. The first metallic coil is configured such that when in contact with both the outer surface of the exhaust manifold and the outer surface of the first exhaust conduct, the first metallic coil shields the first flexible coupler from the exhaust gas and also conducts heat between the exhaust manifold and the first exhaust conduit. The second metallic coil is configured such that when in contact with both the outer surface of the first exhaust conduit and the outer surface of the second exhaust conduct, the second metallic coil shields the second flexible coupler from the exhaust gas and also conducts heat between the first exhaust conduit and the second exhaust conduit.

BRIEF DESCRIPTION OF THE DRAWINGS

In the drawings, FIGS. 26-34 are new.

FIG. 1 is a perspective view of a four-cylinder, four-stroke, V-style internal combustion engine for a marine drive.

FIG. 2 is a view like FIG. 1, wherein the intake manifold of the engine is removed.

FIG. 3 is a view like FIG. 2, wherein the exhaust manifold is removed and showing a catalyst receptacle disposed in the valley defined by the cylinders of the engine.

FIG. 4 is a view of section 4-4 taken in FIG. 2.

FIG. 5 is a perspective view of another example of a four-cylinder, four-stroke, V-style internal combustion engine for a marine drive.

FIG. 6 is a view like FIG. 5, showing a catalyst receptacle disposed in the valley defined by the cylinders of the engine.

FIG. 7 is a perspective view of another example of a four-cylinder, four-stroke, V-style internal combustion engine for a marine drive.

FIG. 8 is a view like FIG. 7, showing a catalyst receptacle disposed in the valley defined by the cylinders of the engine.

FIG. 9 is a view of section 9-9 taken in FIG. 7.

FIG. 10 is a perspective view of another example of a four-cylinder, four-stroke, V-style internal combustion engine for a marine drive.

FIG. 11 is a perspective view of another example of a V-style internal combustion engine for a marine drive.

FIG. 12 is a view like FIG. 11, having an exhaust manifold removed therefrom.

FIG. 13 is a top view of the example shown in FIG. 11.

FIG. 14 is an exploded view of the embodiment shown in FIG. 11.

FIG. 15 is a view of section 15-15, taken in FIG. 11.

FIG. 16 is a perspective view, partially cut away, of another example of a V-style internal combustion engine for a marine drive.

FIG. 17 is a view of Section 17-17, taken in FIG. 16.

FIG. 18 is a view of Section 18-18, taken in FIG. 16.

FIG. 19 is taken from U.S. Pat. No. 9,616,987 and is a perspective view of an internal combustion engine for marine propulsion device.

FIG. 20 is a perspective view of an exhaust manifold.

FIG. 21 an exploded view of a lower portion of the exhaust manifold and cooling water sprayers for spraying cooling water into the exhaust manifold.

FIG. 22 is a view of Section 4-4, taken in FIG. 20.

FIG. 23 is a view of Section 5-5, taken in FIG. 20.

FIGS. 24 and 25 depict a first example of a cooling water sprayer.

FIGS. 26 and 27 depict a second example of the cooling water.

FIG. 28 is a partial side sectional view of an exhaust system, coupling an exhaust manifold and an exhaust conduit according to the present disclosure.

FIG. 29 is a view of Section 28-28, taken in FIG. 28.

FIG. 31 depicts one embodiment according to the present disclosure, which is similar to the embodiment shown in FIG. 28.

FIG. 32 depicts an another embodiment according to the present disclosure.

FIG. 33 is a perspective view of an exhaust system similar to that of FIG. 32.

FIG. 34 is a view of Section 33-33, taken in FIG. 33, also shown with a partial close-up view.

DETAILED DESCRIPTION OF THE DRAWINGS

In the present disclosure, certain terms have been used for brevity, clearness and understanding. No unnecessary limitations are to be inferred therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims. Each limitation in the appended claims is intended to invoke interpretation under 35 U.S.C. § 112, sixth paragraph only if the terms "means for" or "step for" are explicitly recited in the respective limitation.

Figure 1:
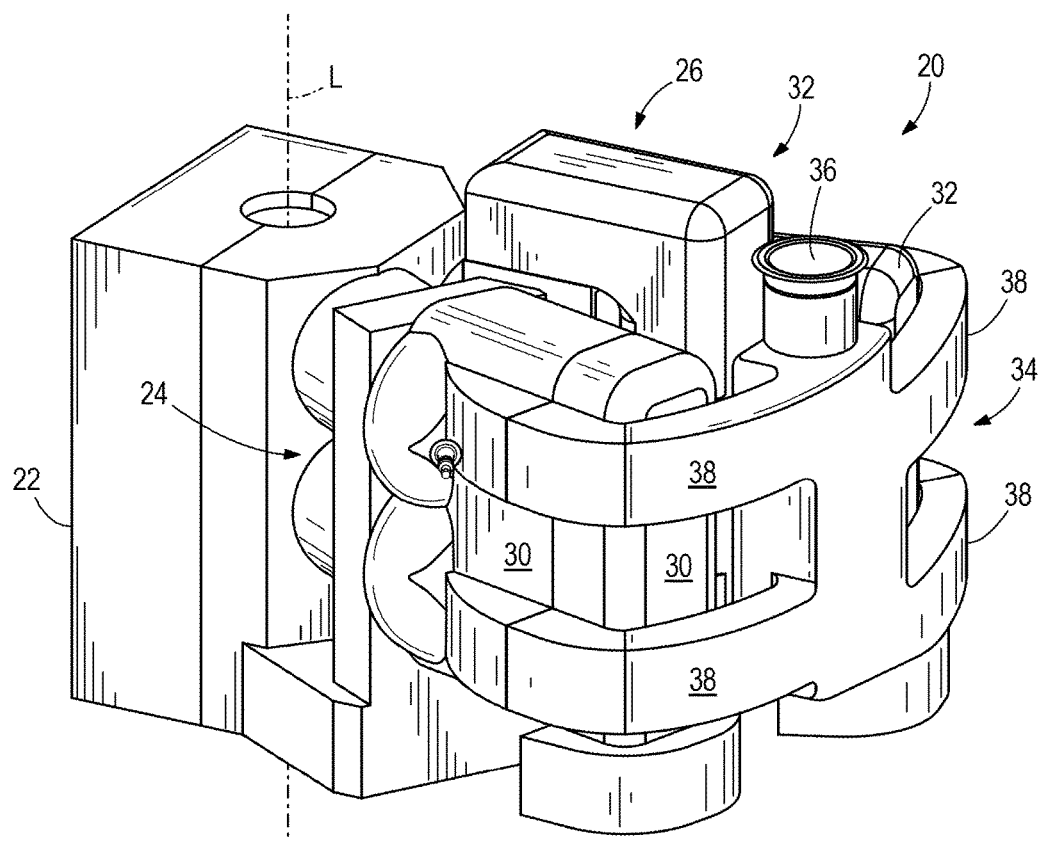
FIGS. 1-18 are taken from U.S. patent application Ser. No. 15/363,280

FIG. 1 depicts a marine engine 20, which in the example shown is a four-cylinder, four-stroke, V-style engine for an outboard motor. It should be noted however that while the examples that are shown and described herein are four-cylinder, four-stroke, V-style marine engines, the concepts of the prior disclosure are also fully applicable to marine engines having any number of cylinders, including but not limited to six and eight cylinder V-style marine engines in outboard, inboard and inboard/outboard marine engine configurations. In FIG. 1, the marine engine 20 includes a cylinder block 22 on which first and second banks of aligned cylinders 24, 26 are aligned with respect to a longitudinal axis L and extend transversely with respect to each other in a V-shape so as to define a valley 28 (see FIGS. 2 and 3) there between. First and second cylinder heads 30, 32 are located on the first and second banks of aligned cylinders 24, 26, respectfully. An intake manifold 34 is also shown in FIG. 1. The intake manifold 34 receives intake air via inlet port 36 and conveys the intake air to the respective first and second banks of aligned cylinders 24, 26 for the combustion process. In the example shown, an intake air passageway 38 is provided for each cylinder in the first and second banks of aligned cylinders 24, 26. Other configurations of the intake manifold 34 can be employed and the example shown is not intended to be limiting on the prior disclosure. As is conventional, intake air supplied via the intake manifold 34 is utilized during the combustion process in the marine engine 20.

Figure 3:
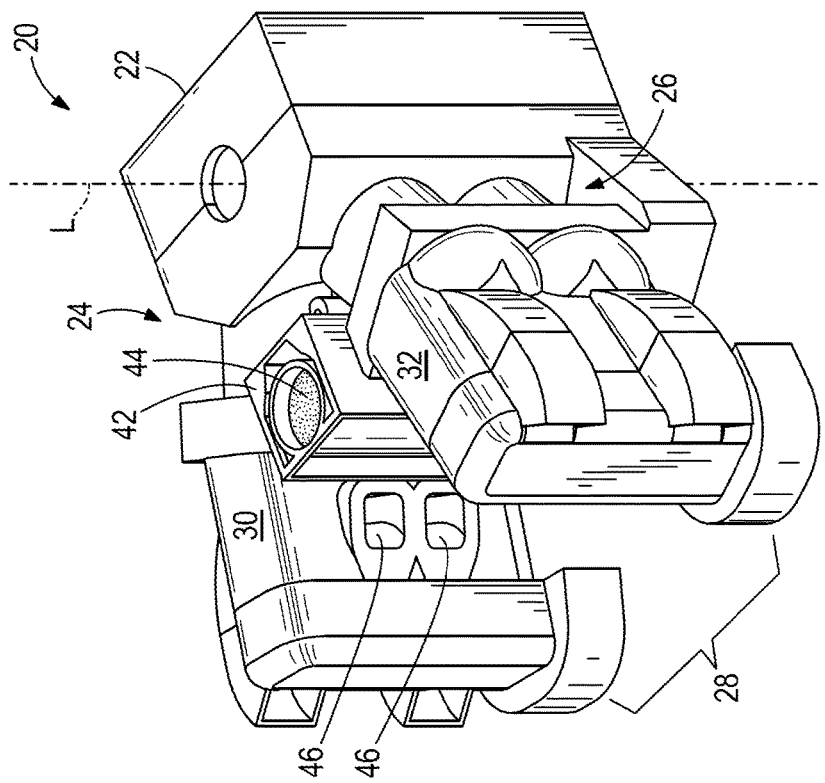
Figure 2:
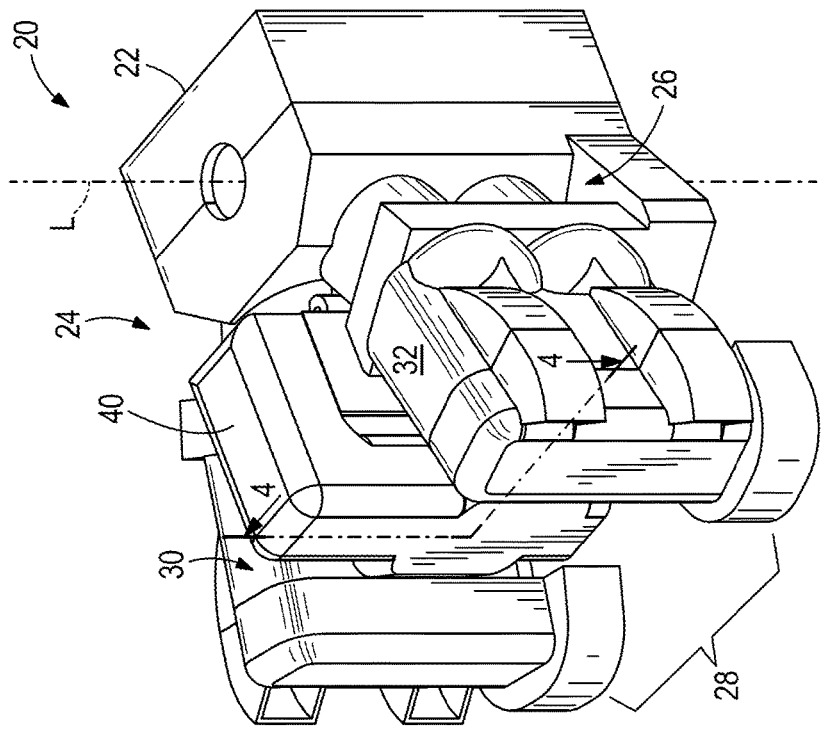

FIGS. 2 and 3 depict the marine engine 20 without the intake manifold 34. An exhaust manifold 40 conveys exhaust gas from the first and second cylinder heads 30, 32 to a catalyst receptacle 42 disposed in the valley 28. In this example, the exhaust manifold 40 is disposed in the valley 28 and receives exhaust gas from the first and second banks of aligned cylinders 24, 26 via the first and second cylinder heads 30, 32. FIG. 3 depicts the marine engine 20 having the exhaust manifold 40 removed and shows the catalyst receptacle 42 containing at least one catalyst 44 that treats exhaust gas from the first and second banks of aligned cylinders 24, 26. The catalyst receptacle 42 has an inner cylindrical shape; however other shapes and sizes of catalyst receptacles can be employed. Optionally, the catalyst receptacle 42 can be cast in to the cylinder block 22.

Figure 4:
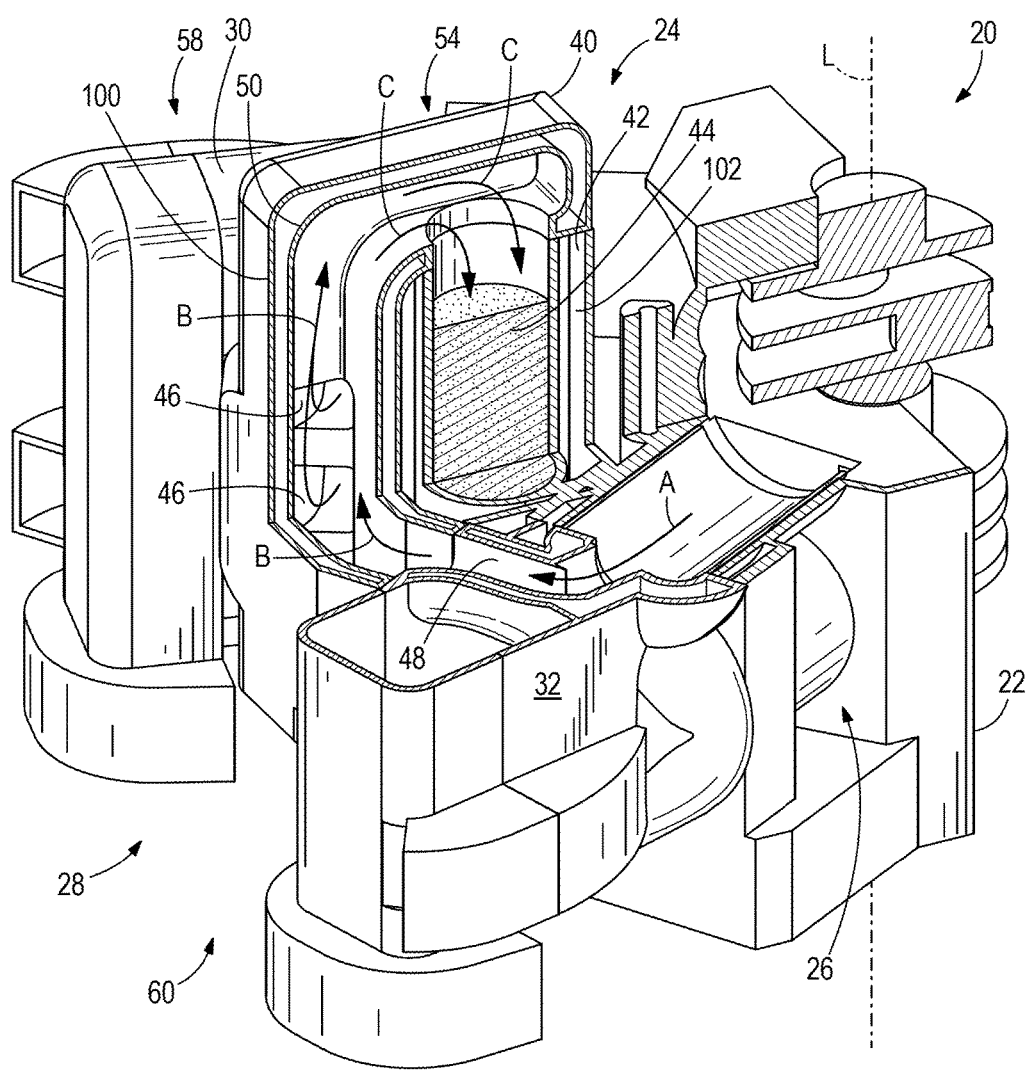

FIG. 4 depicts the marine engine 20 at section 4-4 taken in FIG. 2. The exhaust manifold 40 has first ports 46 receiving exhaust gas from the first cylinder head 30, second ports 48 receiving exhaust gas from the second cylinder head 32, and a conduit 50 conveying the exhaust gas from the first and second ports 46, 48 to the catalyst receptacle 42. The number of ports can vary from that which is shown and described. In the example shown, ports 46, 48 are provided for each cylinder in the first and second banks of aligned cylinders 24, 26, respectively. FIG. 4 shows two ports 46 and one port 48. In this example, a second port 48, which is not shown in this view, is also provided for the second bank of aligned cylinders 26. The first ports 46 and second ports 48 are inwardly oriented towards the valley 28 and the exhaust manifold 40 is configured to receive and mix exhaust gas from both of the first and second ports 46, 48 in the conduit 50. In this configuration, the exhaust manifold 40 extends out from the end of the valley 28 and then back into the valley 28 at a bend 54, which in the example shown is a 180-degree bend. Exhaust gas is conveyed through the bend 54 to the catalyst receptacle 42 wherein the exhaust gas is treated by catalyst 44. In this configuration, from the first and second ports 46, 48, the conduit 50 only reverses direction once with respect to the longitudinal axis L, which reversal is provided by the 180-degree bend 54.

As can be seen from FIG. 4, the valley 28 has first and second opposite (in this example, top and bottom) ends 58, 60. In this example, the exhaust manifold 40 extends out from and back into only one of the first and second ends 58, 60, namely the first end 58 in this example. Exhaust gas thus flows transversely at arrows A from the first and second banks of aligned cylinders 24, 26 through the first and second ports 46, 48. Once into the exhaust manifold 40, exhaust gas flows transversely with respect to the first and second ports 46, 48 (longitudinally to the engine), out of the first end 58 of the valley 28 and through the conduit 50 at arrow B. Once reversing direction through the bend 54 at arrow C, exhaust gas flows back into the first end 58 of the valley 28 and into the catalyst receptacle 42 for treatment by the catalyst 44. After flowing through the catalyst 44, exhaust gas exits the catalyst receptacle 42 via the second end 60 of the valley 28 for disposal from the propulsion system via conventional means.

A cooling jacket 100 can be provided around the exhaust manifold 40. Cooling fluid (not shown), such as water drawn from the body of water in which the vessel is operating can be pumped through the cooling jacket in a conventional manner to maintain the exhaust manifold at a preferred temperature. A cooling jacket 102 can also be provided on the catalyst receptacle 42 to maintain the catalyst and/or catalyst receptacle at a preferred temperature.

The exhaust system shown in FIGS. 1-4 has been found by the inventors to provide significant packaging and cost advantages and provides an arrangement that meets space constraints and minimizes weight. By routing the exhaust gas through only a single bend 54 in the exhaust manifold 40 pressure drop is decreased and thus efficiency of the marine engine 20 is advantageously increased.

Figures 5, 6:
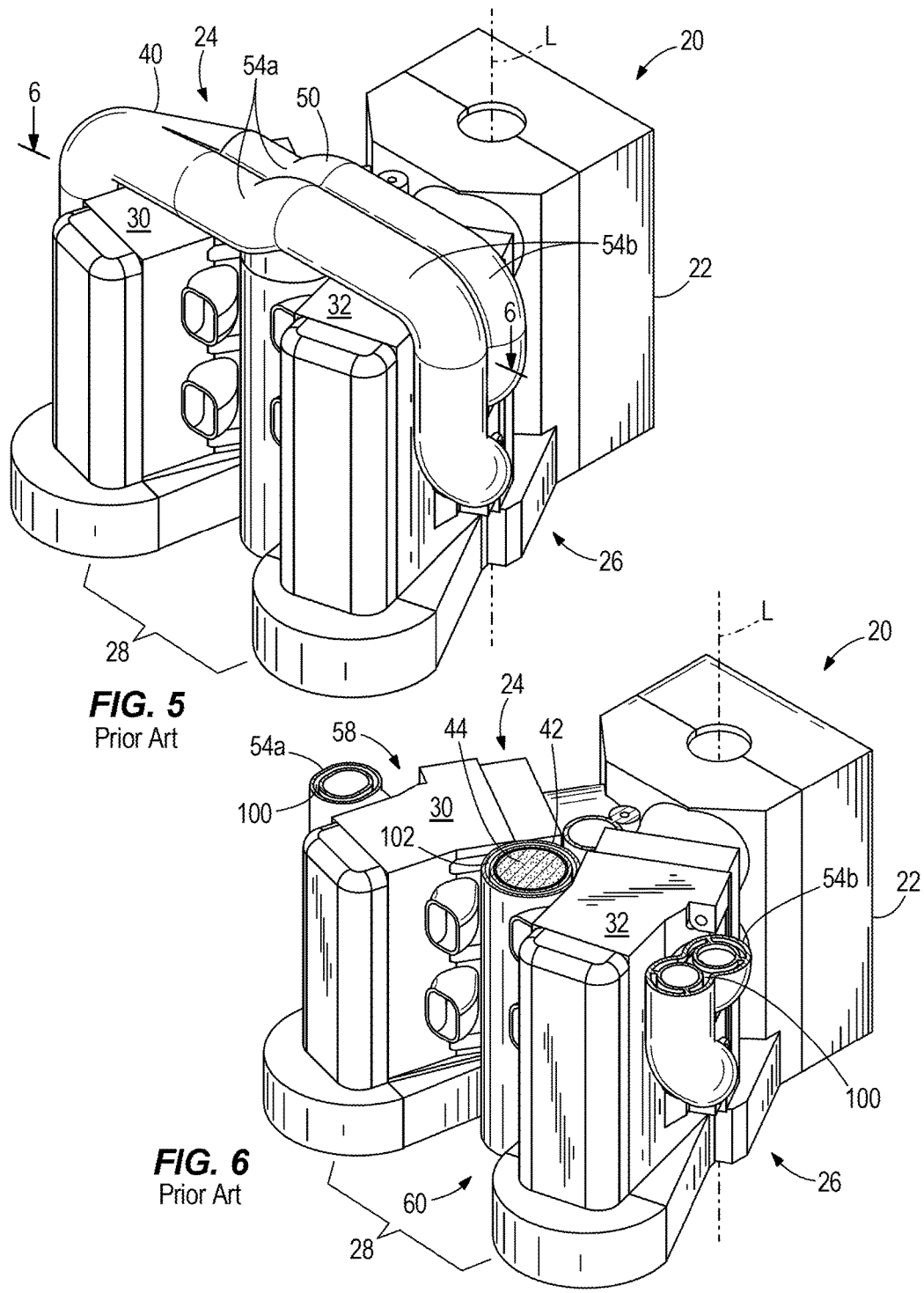

FIGS. 5 and 6 depict another example of the marine engine 20 having like reference numbers applied to like structures of the examples of FIGS. 1-4. In FIGS. 5 and 6, the ports 46, 48 are outwardly oriented with respect to the valley 28. In this example, the conduit 50 has opposing 180-degree bends 54a extending inwardly from the first ports 46 to the catalyst receptacle 42 and opposing 180-degree bends 54b extending inwardly from the second ports 48 to the catalyst receptacle 42. Thus, the exhaust manifold 40 extends inwardly from the outwardly oriented first and second ports 46, 48 into only one of the first and second ends 58, 60 of the valley 28 (in this case the first end 58). As such, the exhaust gas flows transversely from the outwardly oriented first and second ports 46, 48, through the conduits 50, reversing direction with respect to the longitudinal axis through the opposing 180-degree bends 54a, 54b and then into the first end 58 of the valley 28 to the catalyst receptacle 42, wherein the exhaust gas is treated by the catalyst 44. Again, by routing the exhaust gas through only a single 180-degree bend in the exhaust manifold 40 (i.e. bends 54a and 54b for each respective port 46, 48), the exhaust gas only reverses direction once with respect to the longitudinal axis and pressure drop is decreased and thus efficiency of the marine engine 20 is advantageously increased.

Figure 7:
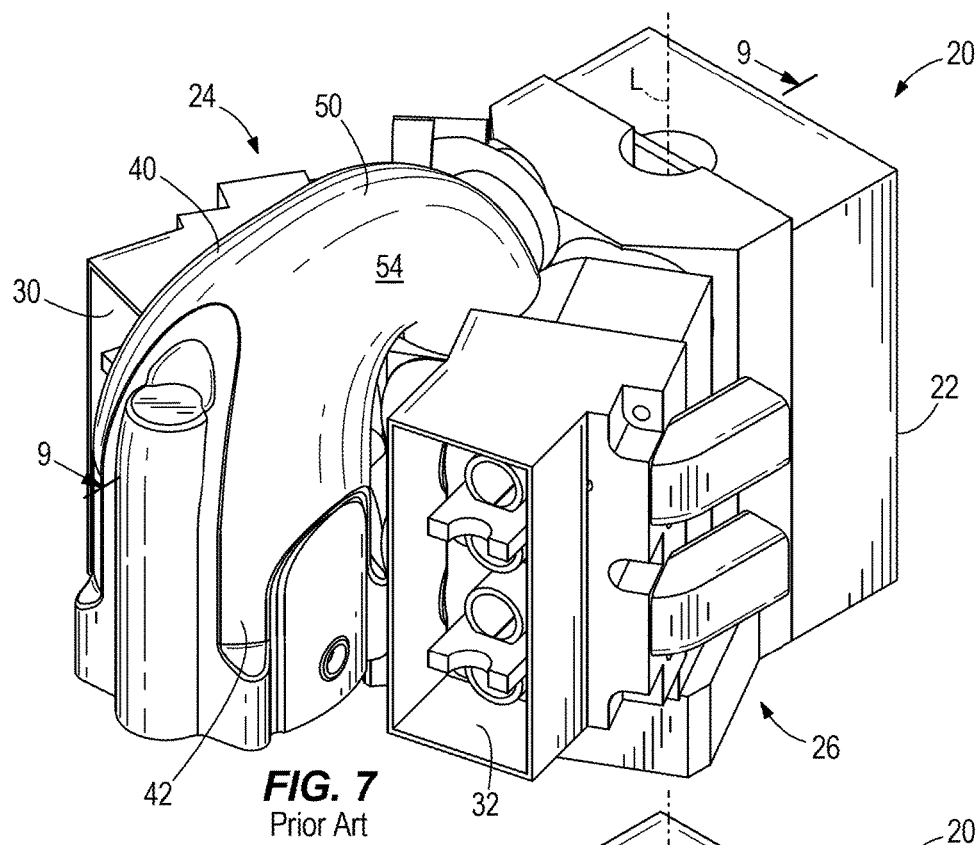
Figure 8:
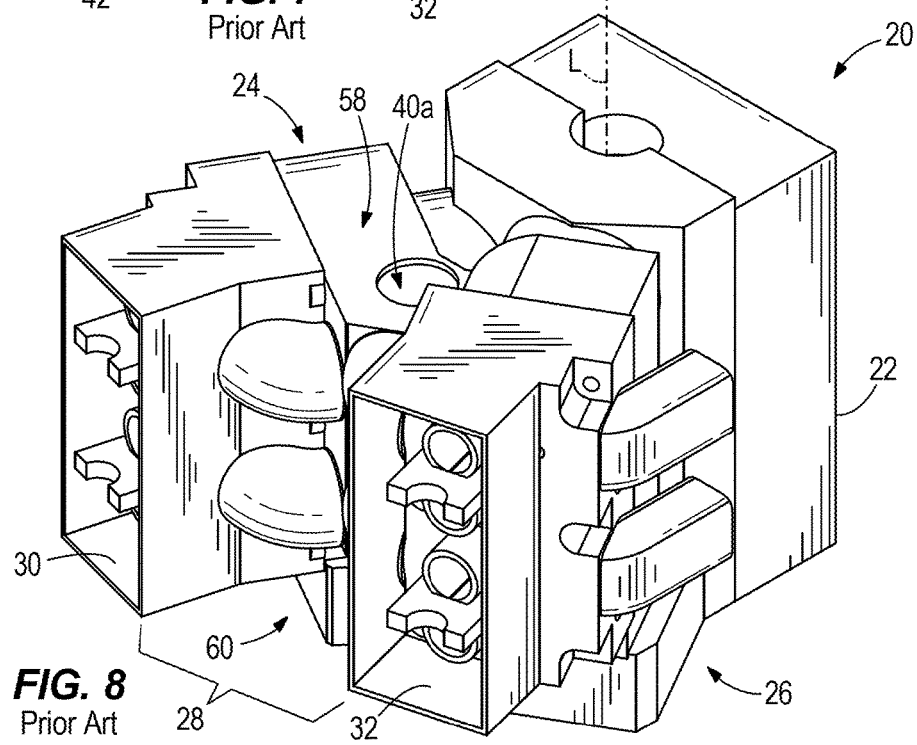
Figure 9:
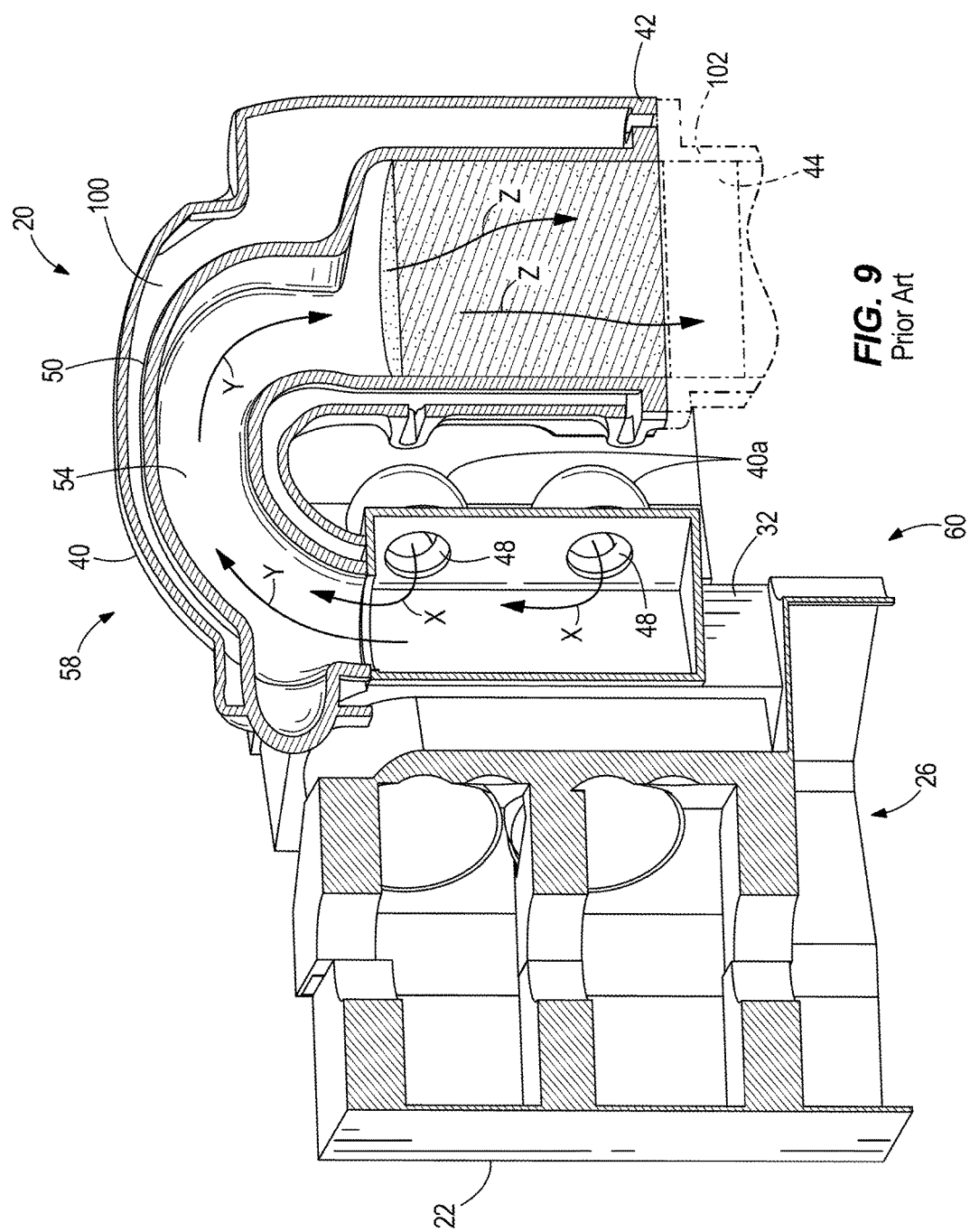

FIGS. 7-9 depict a marine engine 20 similar to the examples shown herein above, and having like reference numbers applied to similar structures. In FIGS. 7-9, the exhaust manifold 40 is located at the center of the valley 28 and has a portion 40a that is cast into the cylinder block 22. In this example, exhaust gas flows transversely from the first and second ports 46, 48, as shown in FIG. 9 at arrow X, through conduit 50 and reverses direction with respect to the longitudinal axis through the 180-degree bend 54, as shown at arrow Y, and then into the catalyst receptacle 42 located in the valley 28, as shown at arrow Z. The conduit 50 only reverses direction once with respect to the longitudinal axis L.

Figure 10:
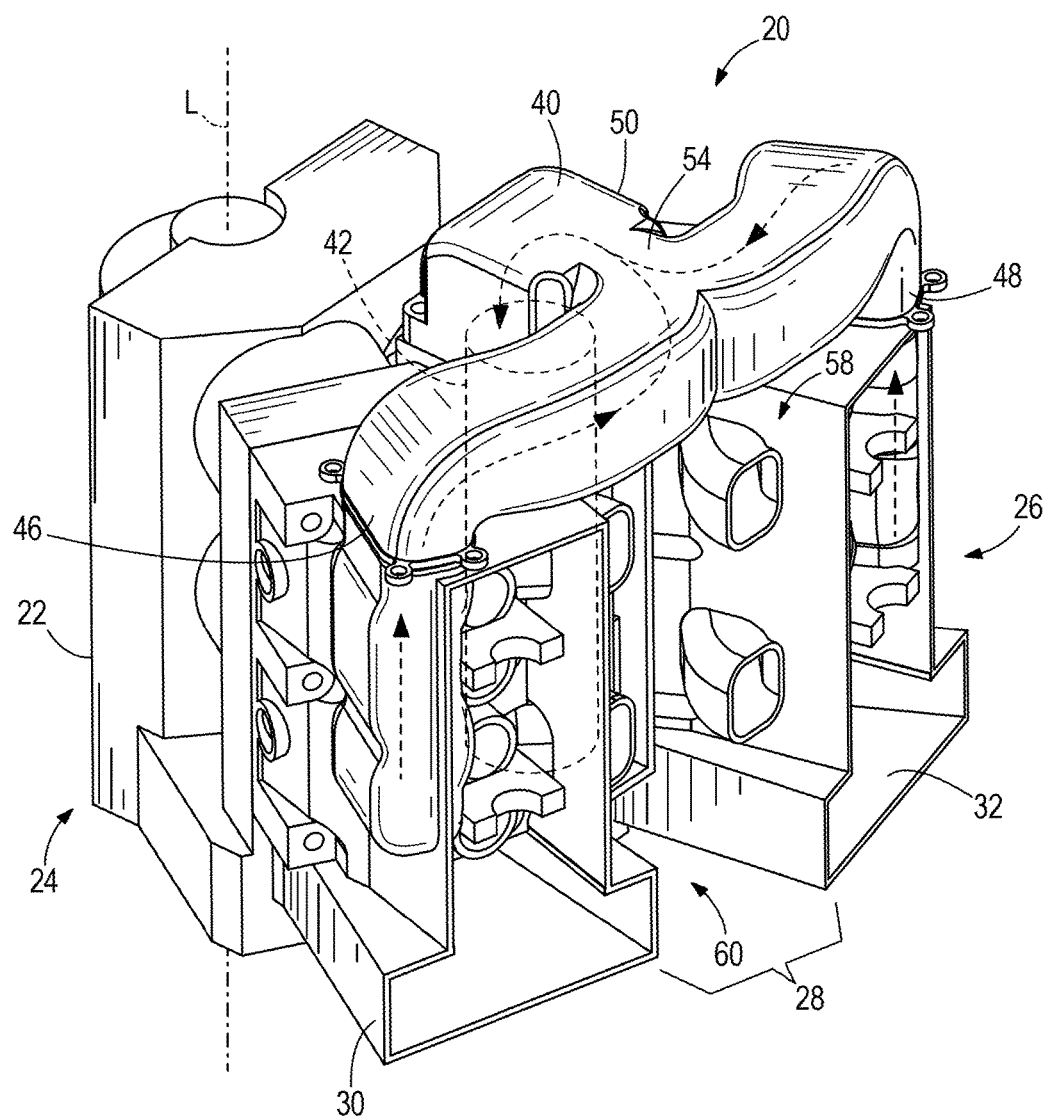
Figure 11:
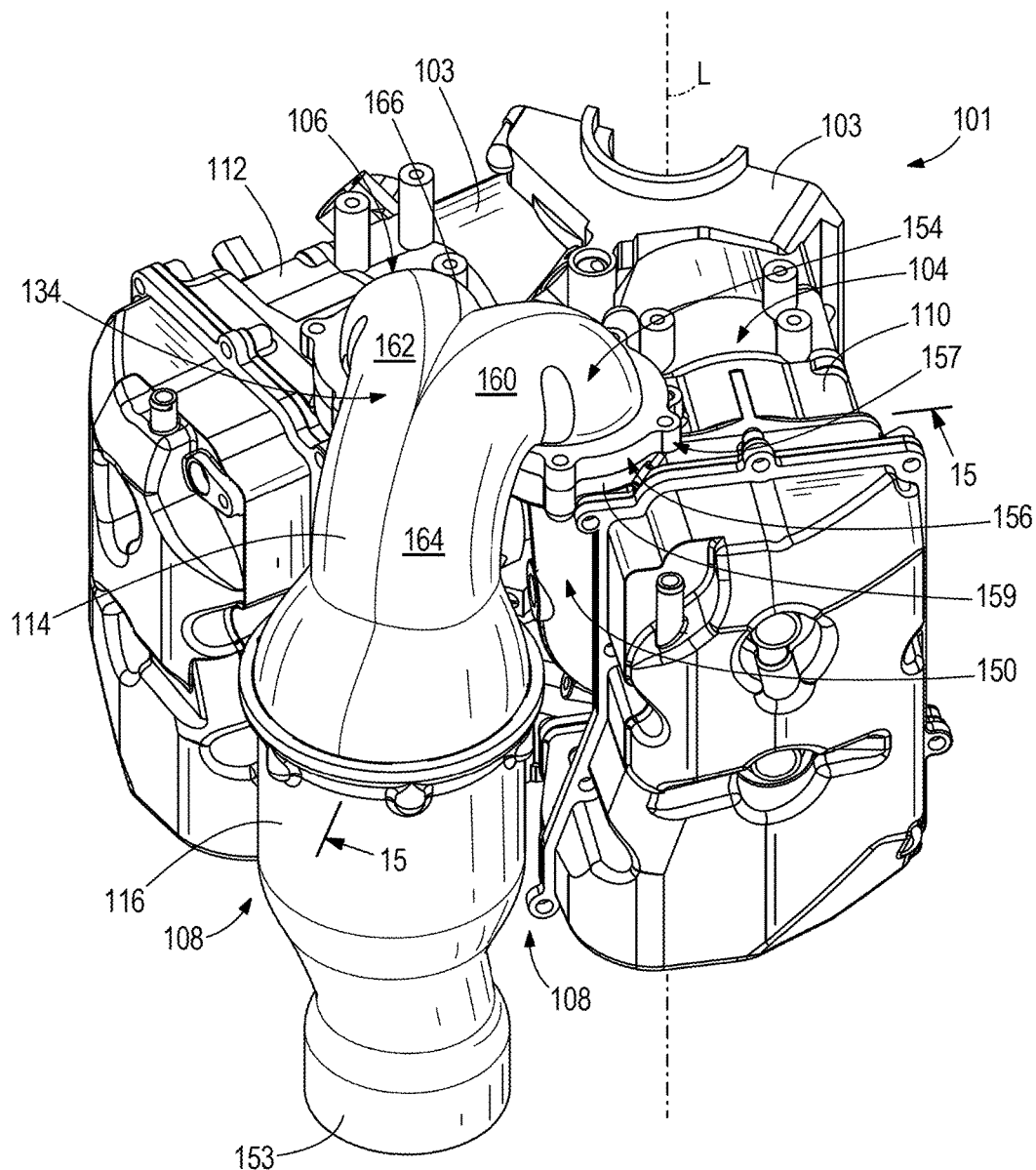

FIG. 10 depicts a marine engine 20 similar to the examples shown herein above, and having like reference numbers applied to similar structures. In FIG. 10, the first and second ports 46, 48 include single ports 46, 48 located at one end of the first and second cylinder heads 30, 32. The catalyst receptacle 42 is cast into the cylinder block 22. Again, the conduit 50 only reverses direction once with respect to the longitudinal axis L.

The prior disclosure thus provides a marine engine 20 having an exhaust system that comprises a catalyst receptacle 42 disposed in a valley 28 formed by the V-shape of first and second banks of aligned cylinders 24, 26. The catalyst receptacle 42 contains a catalyst 44 that treats exhaust gas from the first and second banks of aligned cylinders 24, 26. An exhaust manifold 40 conveys exhaust gas from first and second cylinder heads 30, 32 to the catalyst receptacle 42. The exhaust manifold 40 has a first port 46 receiving exhaust gas from the first cylinder head 30, a second port 48 receiving exhaust gas from the second cylinder head 32, and a conduit 50 conveying the exhaust gas from the first and second ports 46, 48 to the catalyst receptacle 42. Exhaust gas thus flows from the first and second cylinder heads 30, 32 and transversely through the first and second ports 46, 48. Once into the exhaust manifold 40, exhaust gas flows transversely with respect to the first and second ports 46, 48, out of the valley 28, and through the conduit 50. Exhaust gas flows back into the first end 58 of the valley 28 and into the catalyst receptacle 42 for treatment by the catalyst 44.

Figure 12:
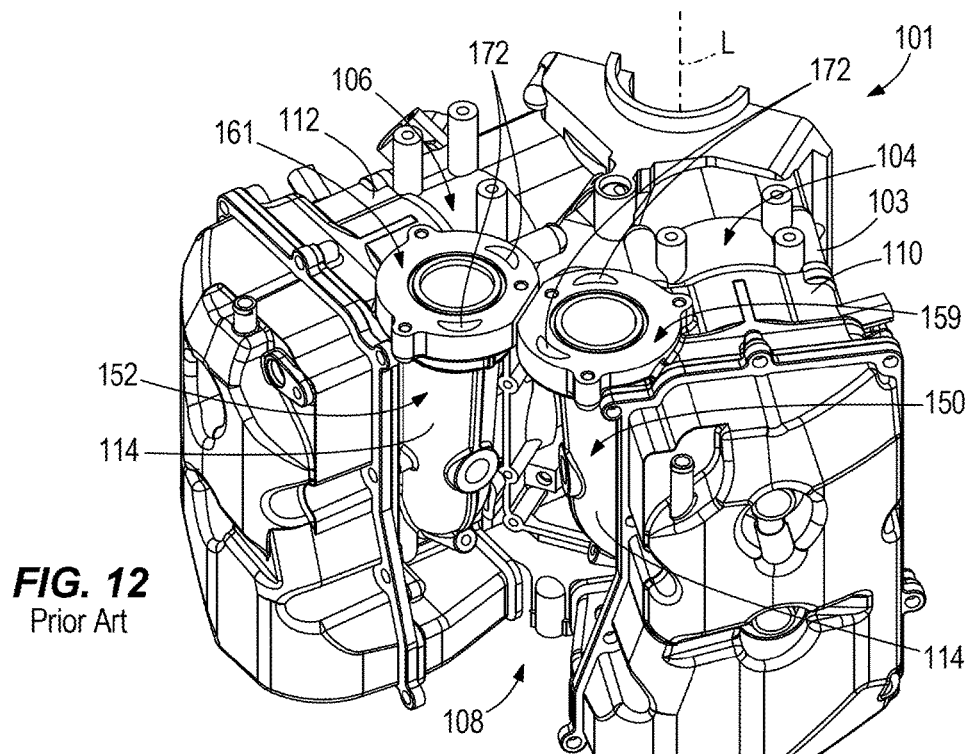
Figure 13:
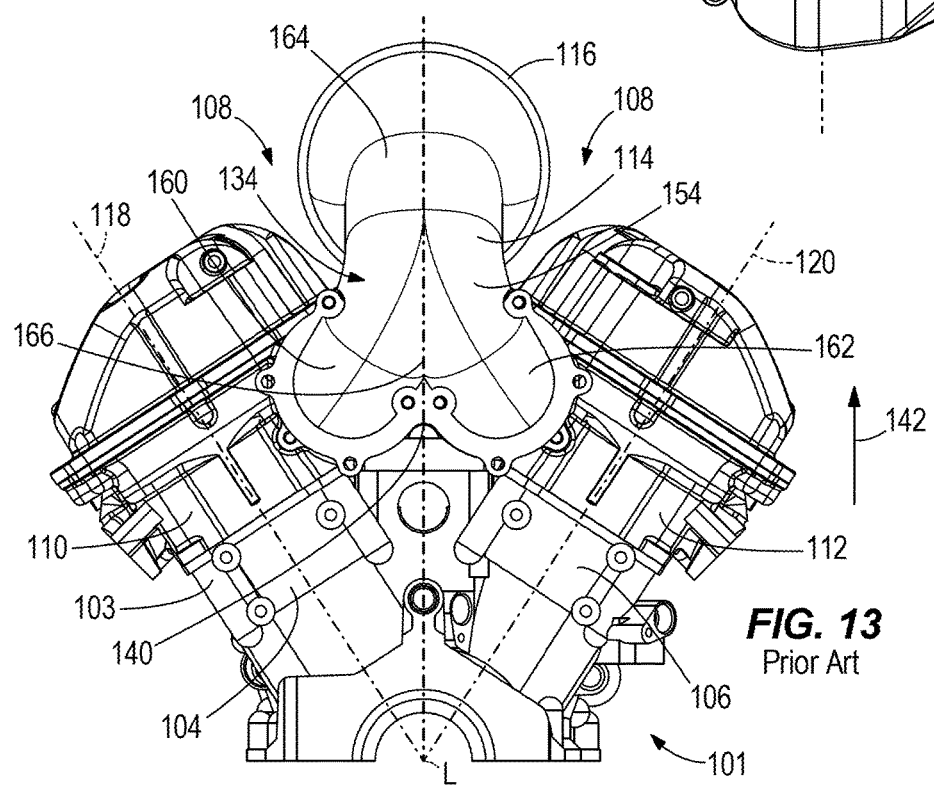

FIGS. 11-15 depict another example of a marine engine 101, which in the example shown is a four-cylinder, four-stroke, V-style engine for an outboard motor. As with the previous examples, it should be noted that the concepts of this embodiment are also fully applicable to engines having any number of cylinders, including but not limited to six and eight cylinder V-style marine engines in outboard, inboard and inboard/outboard marine engine configurations. In FIGS. 11-15, the marine engine 101 includes a cylinder block 103 on which first and second banks of cylinders 104, 106 are aligned with respect to a longitudinal axis L. The first and second banks of cylinders 104, 106 extend transversely with respect to each other in a V-shape so as to define a valley 108 (e.g. see FIG. 13) there between. As shown in FIG. 13, the valley 108 is defined between the center lines 118, 120 of the respective first and second banks of cylinders 104, 106. As shown, in FIG. 15, the valley 108 has a top end designated at 122 along an uppermost end of the cylinder block 103 and a bottom end 124 along a lowermost end of the cylinder block 103. First and second cylinder heads 110, 112 are located on the first and second banks of cylinders 104, 106, respectively.

A conduit 114 conveys exhaust gas from the first and second banks of cylinders 104, 106 to a catalyst receptacle 116 disposed in the valley 108. The conduit 114 can be formed of one or more than one components connected together in series and can extend from the first and second banks of cylinders 104, 106 to the catalyst receptacle 116 and optionally beyond the catalyst receptacle 116 to an outlet 153 for discharging exhaust gas to an outboard motor housing component and/or outside the outboard motor. The conduit 114 can form part of or all of the catalyst receptacle 116. As explained further herein below, optionally, portions of the conduit 114 can be cast with the cylinder block 103. Other portions of the conduit 114 can be formed separately from the cylinder block and attached thereto. The catalyst receptacle 116 contains a catalyst 126 that treats exhaust gas from the first and second banks of cylinders 104, 106. The catalyst receptacle 116 has a cylindrical inner perimeter 128; however other shapes and sizes of catalyst receptacles can be employed.

An intake manifold (not shown) receives and conveys intake air via intake ports 105 (see FIG. 14) to the respective first and second banks of cylinders 104, 106 for the combustion process. In this example, respective pairs of the intake ports 105 are located outside of the valley 108, on opposite sides of the first and second banks of cylinders 104, 106. Various configurations of the intake manifold can be employed, one example of which is the intake manifold 34 shown in FIG. 1 and described herein above. As is conventional, intake air supplied via the noted intake manifold is utilized during the combustion process in the marine engine 101.

Figure 14:
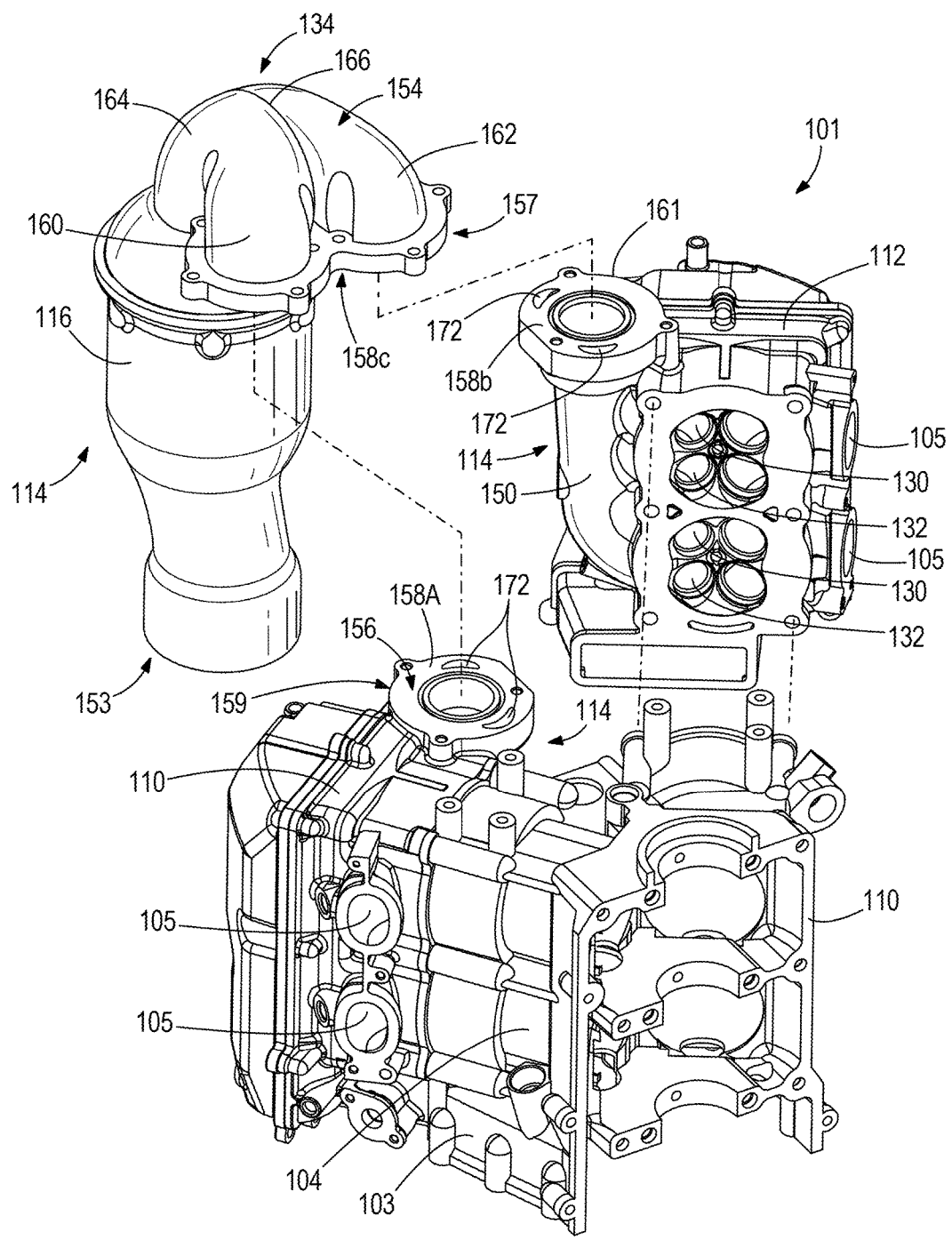
Figure 15:
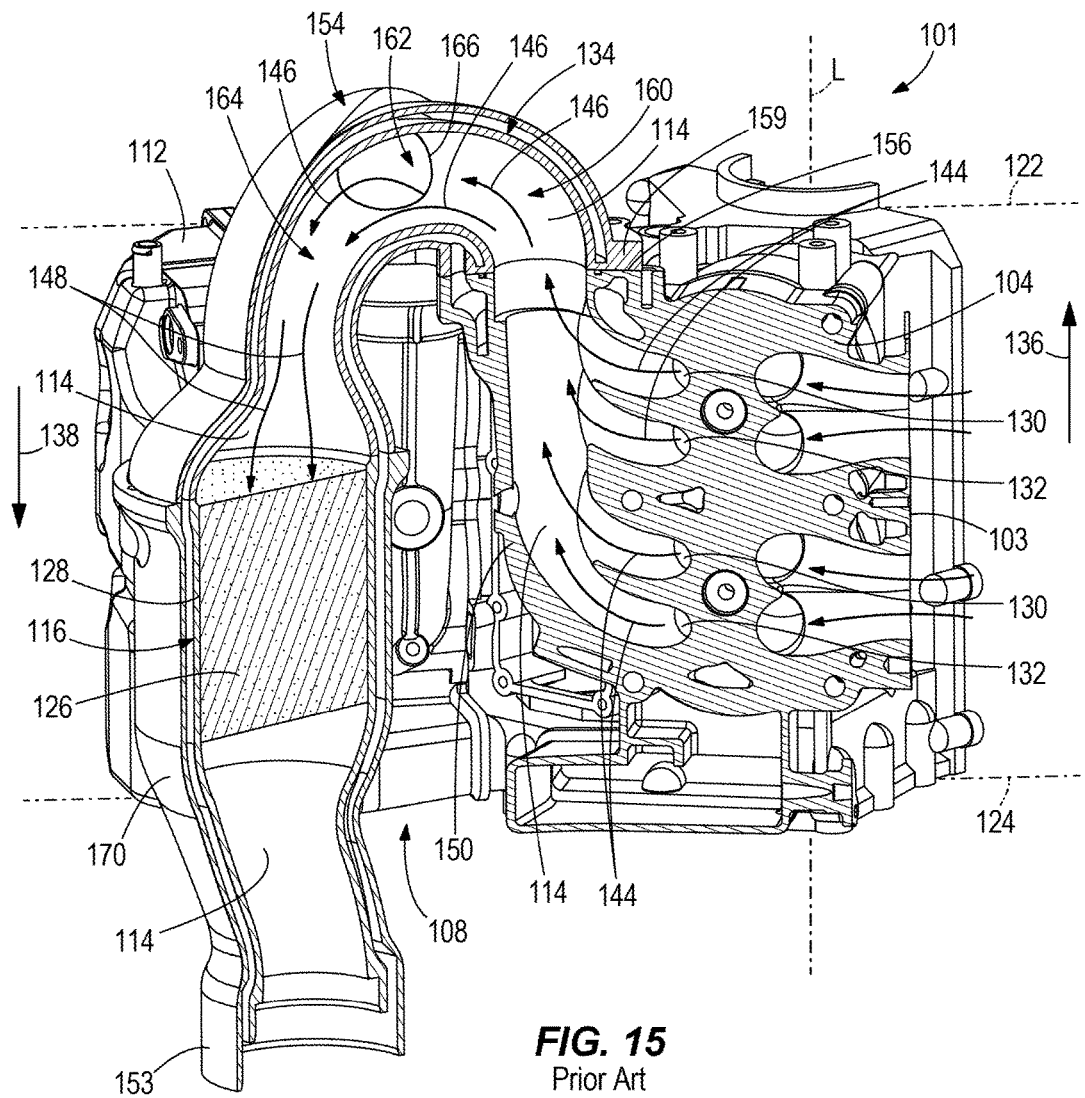

Referring to FIGS. 14 and 15, the conduit 114 receives exhaust gas from each of the first and second banks of cylinders 104, 106 via first and second ports 130, 132 on each cylinder in the banks 104, 106. The conduit 114 includes a single 180-degree bend 134 that is located higher than the first and second banks of cylinders 104, 106 with respect to the longitudinal axis L. As shown in FIG. 15, the 180-degree bend 134 conveys the exhaust gas from a longitudinally upward directional flow shown at arrow 136 to a longitudinally downward directional flow shown at arrow 138 with respect to the longitudinal axis L. As shown in FIG. 13, the valley 108 has a center 140 located proximate to the cylinder block 103. The 180-degree bend 134 of the conduit 114 carries the exhaust gas radially outwardly as shown at arrow 142, away from the center 140 of the valley 108. As shown in FIG. 15, at least a portion of the conduit 114 extends out from (i.e. above) the top end 122 of the valley 108 and then back into (i.e. below) the top end 122 of the valley 108 with respect to the longitudinal axis L. Thus, at arrows 144, exhaust gas flows transversely from the first and second ports 130, 132. At arrows 146, exhaust gas flows through the 180-degree bend 134. At arrows 148, exhaust gas flows into and through the catalyst 126 in the catalyst receptacle 116.

Referring to FIG. 12, the conduit 114 includes a first branch conduit 150 receiving exhaust gas from the first bank of cylinders 104 and a second branch conduit 152 receiving exhaust gas from the second bank of cylinders 106. In this example, the first and second branch conduits 150, 152 are separated and are cast in the cylinder heads 110, 112 with the first and second banks of cylinders 104, 106. Referring to FIG. 14, the conduit 114 further includes a third branch conduit 154 receiving exhaust gas from the first and second branch conduits 150, 152 and discharging the exhaust gas through the catalyst receptacle 116. The exhaust gas that flows through the catalyst 126 is discharged through the lower end 153 of the third branch conduit 154 for subsequent discharge from the propulsion device in which the marine engine 101 is located.

A sealing interface 156 (FIG. 15) is provided between an upstream end 157 of the third branch conduit 154 and downstream ends 159, 161 of the first and second branch conduits 150, 152. The third branch conduit 154 is attached to the first and second branch conduits 150, 152 by a plurality of elongated fasteners that extend through the sealing interface 156. As shown in FIG. 14, the sealing interface 156 includes planar seal surfaces 158*a*, 158*b*, 158*c* disposed on the first, second and third branch conduits 150, 152 and 154. The planar sealing surface 158*c* of the third branch conduit 154 mates with the planar sealing surfaces 158*a*, 158*b* of the first and second branch conduits 150, 152. As shown in FIG. 15, the sealing interface 156 is located higher than the first and second banks of cylinders 106 with respect to the longitudinal axis L. The sealing interface 156 transversely extends to the longitudinal axis L.

Referring to FIG. 15, the third branch conduit 154 merges exhaust gas from the first and second branch conduits 150, 152 together at the 180-degree bend 134. The third branch conduit 154 comprises a first conduit portion 160 that receives exhaust gas from the first branch conduit 150, a second conduit portion 162 that receives exhaust gas from the second branch conduit 152, and a third conduit portion 164 that receives exhaust gas from the first and second conduit portions 160, 162. The first and second conduit portions 160, 162 form a 90-degree bend. The third conduit portion 164 forms a 90-degree bend. Together, the 90-degree bends form the noted 180-degree bend 134. The conduit 114 merges the exhaust gas from the first and second branch conduits 150, 152 together within the noted 180-degree bend 134.

A cooling jacket 170 is disposed along the conduit 114 from the lower end 153 to the sealing interface 156. The cooling jacket 170 carries cooling water for cooling the noted exhaust conduit 114 and catalyst 126. At the sealing interface 156, cooling water flows into cooling passages 172 in the first and second branch conduits 150, 152 (see FIG. 12) for cooling additional portions of the engine 101.

The prior disclosure thus provides a marine engine 101 comprising a cylinder block 103 having first and second banks of cylinders 104, 106 that are disposed along a longitudinal axis L and extend transversely with respect to each other in a V-shape so as to define a valley 108 there between. A catalyst receptacle 116 is disposed at least partially in the valley 108 and contains at least one catalyst 126 that treats exhaust from the marine engine 101. A conduit 114 conveys exhaust gas from the marine engine 101 to the catalyst receptacle 116. The conduit 114 receives the exhaust gas from the first and second banks of cylinders 104, 106 and conveys the exhaust gas to the catalyst receptacle 116. The conduit 114 reverses direction only once with respect to the longitudinal axis L. First and second ports 130, 132 communicate with each of the first and second banks of cylinders 104, 106, respectively. The conduit 114 receives exhaust gas from the first and second ports 130, 132. The conduit 114 includes a single 180-degree bend 134 that is located higher than the first and second banks of cylinders 104, 106 with respect to the longitudinal axis L. The 180-degree bend 134 conveys the exhaust gas from a longitudinally upward directional flow 136 to a longitudinally downward directional flow 138 with respect to the longitudinal axis L. The valley 108 has a center 140 located proximate to the cylinder block 103. The 180-degree bend 134 carries the exhaust gas radially outwardly as shown at 142, away from the center 140 of the valley 108. A portion of the conduit 114 extends out from a top end 122 of the valley 108 and then back into the top end 122 with respect to the longitudinal axis L. Exhaust gas flows transversely at 144 from the first and second ports 130, 132, through the 180-degree bend 134 at 146, and then into the catalyst receptacle 116 at 148. The conduit 114 includes a first branch conduit 150 receiving exhaust gas from the first bank of cylinders 104, a second branch conduit 152 receiving exhaust gas from the second bank of cylinders 106, and a third branch conduit 154 receiving exhaust gas from the first and second branch conduits 150, 152 and discharging the exhaust gas to the catalyst receptacle 116. The sealing interface 156 is disposed between the third branch conduit 154 and the first and second branch conduits 150, 152 and attached thereto by at least one elongated fastener that extends through the sealing interface 156. The sealing interface 156 includes a planar seal surface 158*a*, 158*b*, 158*c* that extends transversely to the longitudinal axis L. The sealing interface 156 is located higher than the first and second banks of cylinders 104, 106 with respect to the longitudinal axis L. The third branch conduit 154 merges exhaust gas from the first and second branch conduits 150, 152.

Figure 16:
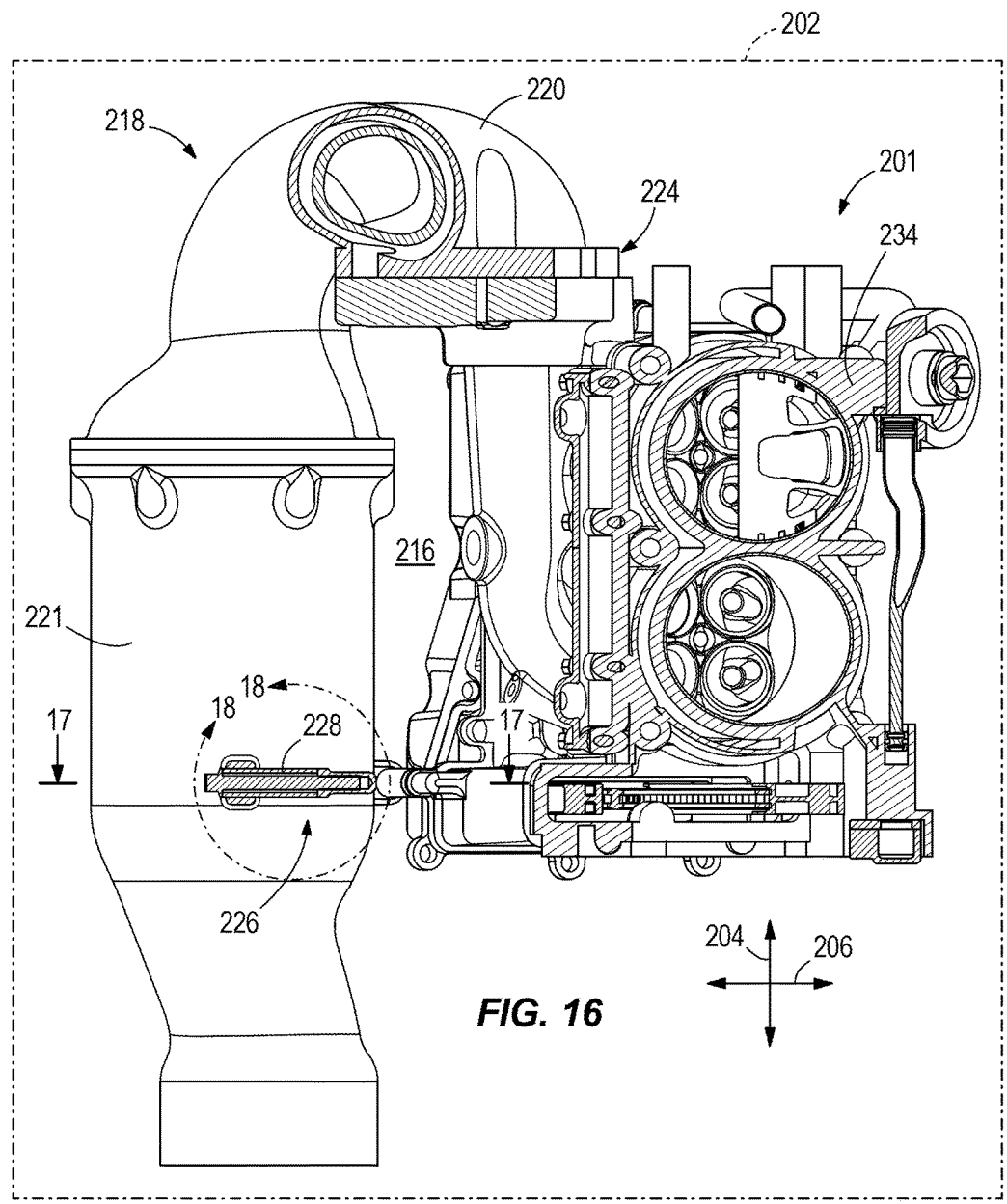
Figure 17:
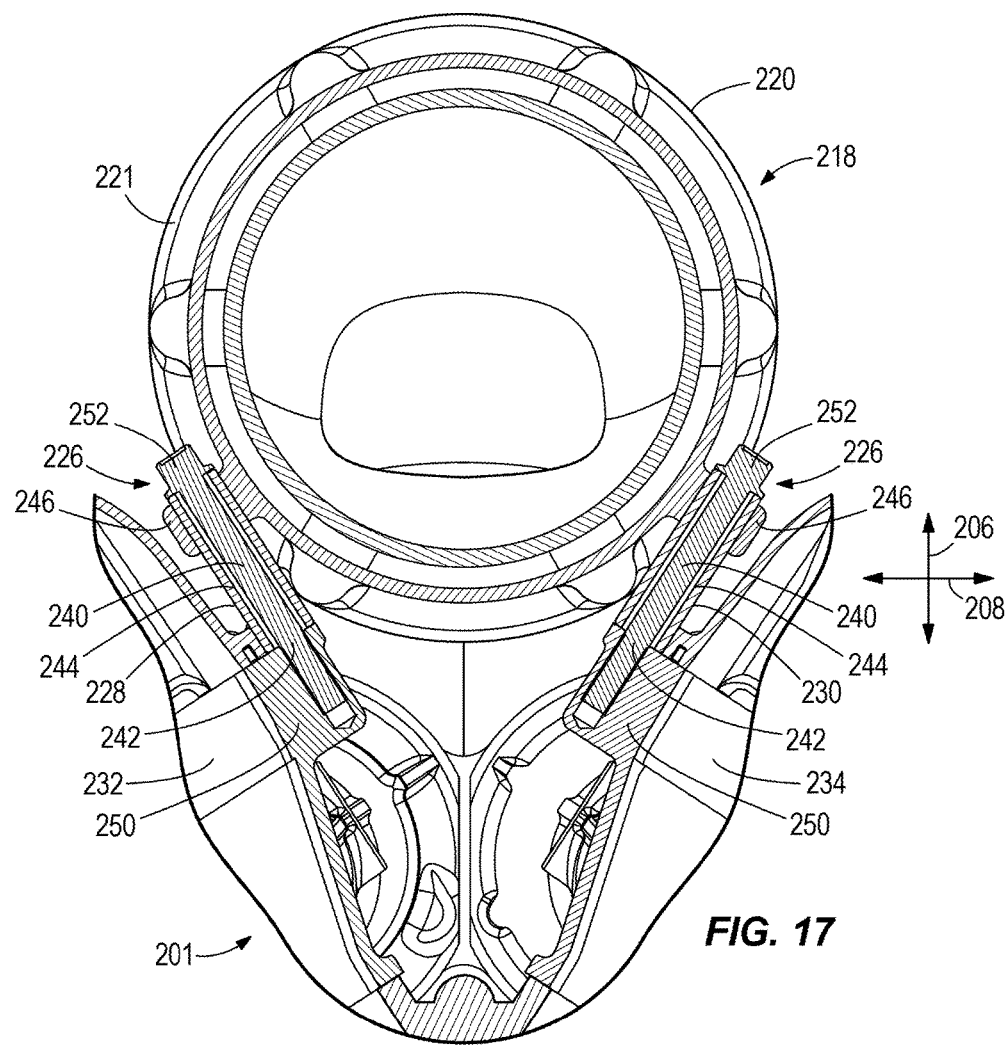
Figure 18:
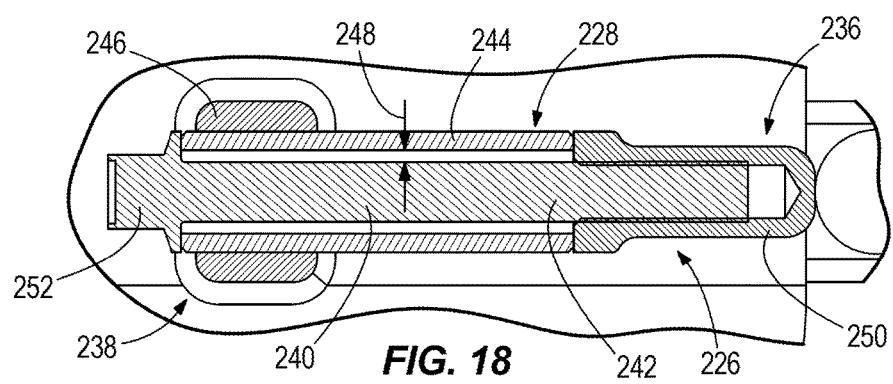

FIGS. 16-18 depict only portions of an internal combustion engine 201 for an outboard motor 202. In the aspects that are not shown, the internal combustion engine 201 is configured the same as the internal combustion engine 101 described herein above with reference to FIGS. 11-15. Similar to the engine 101, the internal combustion engine 201 is a 4-cylinder, 4-stroke, V-style engine. However, as with the previous examples, the concepts of the present disclosure are also applicable to internal combustion engines having any number of cylinders, including but not limited to 6- and 8-cylinder V-style engines in outboard, inboard and inboard/outboard marine engine configurations.

As shown by directional arrows in FIGS. 16 and 17, the outboard motor 202 is a three dimensional apparatus that longitudinally (here, vertically) extends with respect to a longitudinal axis 204, laterally extends with respect to a lateral axis 206 that is perpendicular to the longitudinal axis 204, and transversely extends with respect to a transverse axis 208 that is perpendicular to the longitudinal axis 204 and perpendicular to the lateral axis 206. Although not shown, just like the engine 101, the internal combustion engine 201 has a cylinder block that includes first and second banks of cylinders which are aligned (here, vertically aligned) with respect to the longitudinal axis 204. The first and second banks of cylinders extend transversely with respect to each other in a V-shape so as to define a valley 216 there between.

An exhaust manifold 218 conveys exhaust gas from the internal combustion engine 201. As in the example described herein above with reference to FIGS. 11-15, the exhaust manifold 218 has one or more inlet ports that receive the exhaust gas from the first bank of cylinders, one or more inlet ports that receive the exhaust gas from the second bank of cylinders, and an exhaust conduit 220 that merges and longitudinally conveys the exhaust gas from the noted first and second inlet ports. As shown in FIGS. 16 and 17, the exhaust conduit 220 is at least partially disposed in the valley 216.

As in the examples described herein above, the exhaust conduit 220 has a 180 degree bend that reverses the exhaust gas from an upstream, longitudinally upward directional flow to a downstream, longitudinally downward directional flow. As in the examples described herein above, the exhaust conduit 220 has a first branch conduit that receives the exhaust gas from the first bank of cylinders, a second branch conduit that receives the exhaust gas from the second bank of cylinders, and a third branch conduit that receives the exhaust gas from the first and second branch conduits and discharges the exhaust gas. A sealing interface 224 is disposed between the noted third branch conduit and first and second branch conduits. The sealing interface 224 is secured by a plurality of fasteners (not shown, but just as described herein above) that extend through the sealing interface 224. The sealing interface 224 is a planar sealing surface that extends transversely and laterally to the longitudinal axis 204. As in the examples described herein above, the sealing interface 224 is located vertically higher than the first and second banks of cylinders with respect to the longitudinal axis 204. As in the examples described herein above, an upstream portion of the exhaust conduit 220 is cast into the cylinder heads 232, 234 on the noted first and second banks of cylinders, whereas a downstream portion of the exhaust conduit 220 is fastened to the internal combustion engine 201 by fasteners at the noted sealing interface 224. Optionally, the downstream portion of the exhaust conduit 220 can include a catalyst housing 221 that houses a catalyst for treating the exhaust gas.

Through research and development, the present inventors have determined that is desirable to provide an improved arrangement that better secures the exhaust conduit 220 with respect to the internal combustion engine 201, particularly so as to accommodate manufacturing positional tolerances and thereby achieve a better seal at the sealing interface 224 during assembly, so as to reduce loads that are typically carried at the sealing interface 224, and so as to correctly locate the exhaust conduit 220 relative to the rest of the outboard motor structures.

As shown in FIGS. 16-18, the outboard motor 202 includes a supporting mechanism 226 that supports the exhaust conduit 220 with respect to the internal combustion engine 201. As further described herein below, the supporting mechanism 226 is specially configured to allow the exhaust conduit 220 to laterally move with respect to the internal combustion engine during, and optionally after assembly, for example towards and away from the internal combustion engine 201 with respect to the lateral axis 206. The supporting mechanism 226 is further specially configured to allow the exhaust conduit 220 to move during and optionally after assembly, for example 360 degrees in a plane defined by the lateral and transverse axes 206, 208.

In the illustrated example, the supporting mechanism 226 includes first and second slip joints 228, 230 that each couple the exhaust conduit 220 to the internal combustion engine 201, particularly to the respective first and second cylinder heads 232, 234. The first and second slip joints 228, 230 are disposed on opposite sides of the exhaust conduit 220 with respect to the transverse axis 208 and are set at an angle with respect to each other. The construction of the first and second slip joints 228, 230 can be the same, so the discussion herein below regarding one of the first and second slip joints 228, 230 can equally apply to the other of the first and second slip joints 228, 230. In addition, although the illustrated example shows two slip joints, the number of slip joints can vary and can include one or more than two slip joints.

Referring to FIG. 18, each slip joint 228, 230 has a first end 236 that is fixed with respect to the respective cylinder head 232, 234 on the internal combustion engine 201 and an opposite, second end 238 that is axially slideable back and forth, thereby allowing the noted lateral movement of the exhaust conduit 220 with respect to the internal combustion engine 201. In the illustrated example, each of the first and second slip joints 228, 230 has a fastener 240 having a threaded shank 242, a bushing 244 on the shank 242, and a boss 246 on the exhaust conduit 220. The shank 242 is engaged by threads with another boss 250 on one of the respective first or second cylinder heads 232, 234. The boss 246 on the exhaust conduit 220 is axially slide-able back and forth along the bushing 244, thereby allowing the noted lateral movement of the exhaust conduit 220. The bushing 244 is axially sandwiched between a head 252 on the elongated fastener 240 and the boss 250 on the respective first or second cylinder head 232, 234.

In the illustrated example, the slide-able boss 246 is on the exhaust conduit 220 and the elongated fastener 240 is fixed in the threaded engagement to the boss 250 on the internal combustion engine 201, more particularly on the respective first or second cylinder head 232, 234. However this could be switched so that in other examples, the slide-able boss 246 could be on the internal combustion engine 201, (e.g. on the first or second cylinder head 232, 234) and the elongated fastener 240 could be fixed in a threaded engagement to a fixed boss 250 on the exhaust conduit 220. In examples having two or more slip joints set at an angle to each other, the slip joints together laterally fix the exhaust conduit 220 in place, once the sealing interface 224 is connected. In examples having one or more than one slip joint set parallel to the lateral axis 206, the slip joints together allow continued lateral movement of the exhaust conduit 220, once the sealing interface 224 is connected.

The shank 242 has an outer diameter that is sized smaller than the inner diameter of the bushing 244 so that a radial gap (see arrows 248) exists between the shank 242 and the bushing 244. The elongated fastener 240 is thus 360 degrees radially moveable in the radial gap 248, thereby allowing 360 degree movement of the exhaust conduit 220 in a plane defined by the lateral and transverse axes 206, 208.

By facilitating movement in each of the longitudinal, lateral and transverse directions, the supporting mechanism 226 advantageously allows for better sealing at the sealing interface 224 during assembly of exhaust manifold 218 and the internal combustion engine 201, despite positional tolerances that may occur during the manufacturing process. The supporting mechanism 226 also advantageously helps reduce loads that are typically carried at the sealing interface 224 and helps to correctly locate the exhaust conduit 220 relative to the rest of the outboard motor structures during and after assembly thereof. In some examples, the supporting mechanism 226 can have only a single slip joint or several parallel slip joints such that the exhaust conduit 220 continues to be laterally movable with respect to the internal combustion engine 201 after assembly at the sealing interface 224. In the illustrated example, the first and second slip joints 228, 230 are set at an angle to each other so as to laterally fix the exhaust conduit 220 with respect to the internal combustion engine 201 once the connection at the sealing interface 224 is made.

Figure 19:
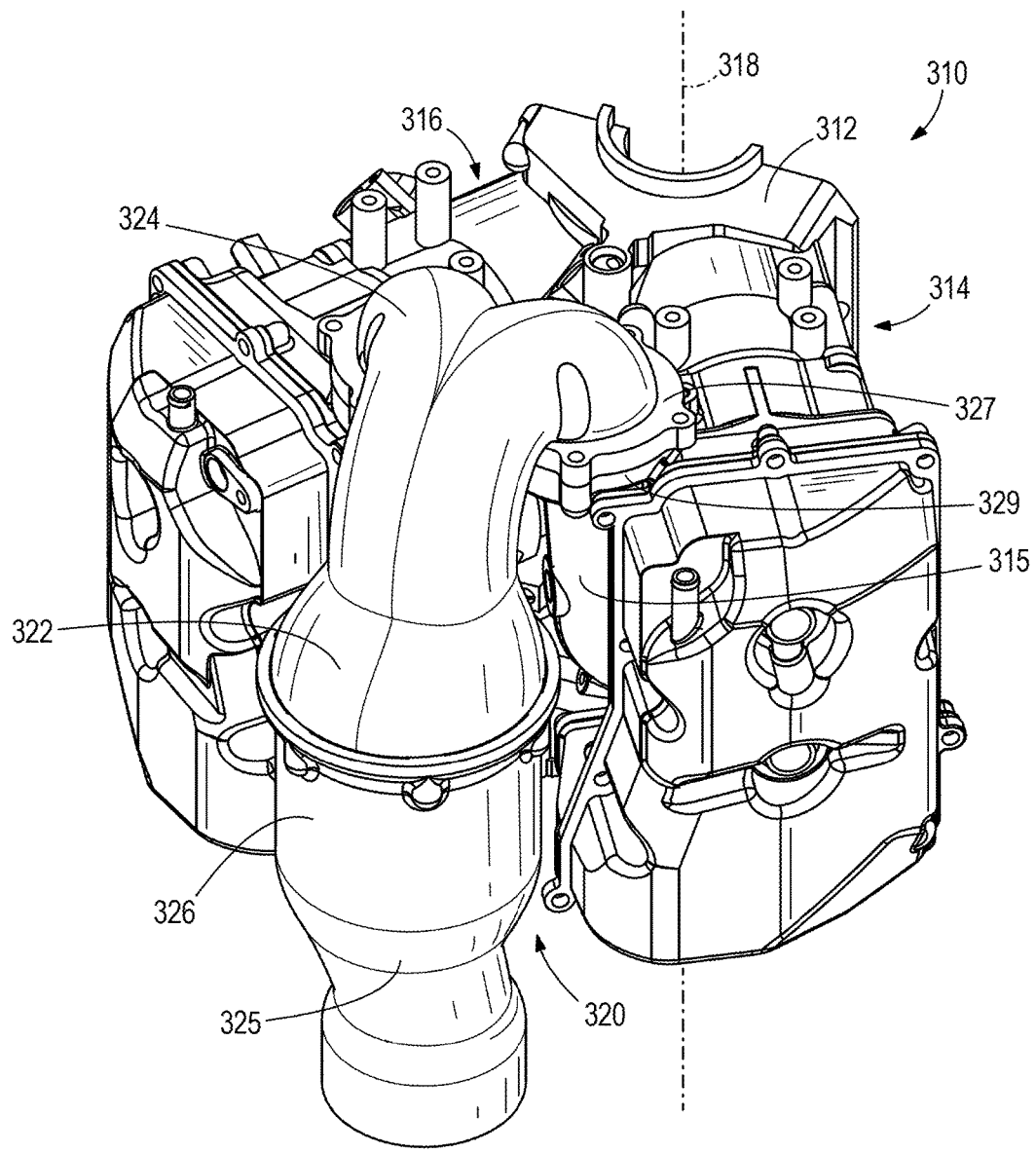
FIGS. 19-25 are taken from U.S. patent application Ser. No. 15/729,747, which are incorporated herein by reference.
Figure 20:
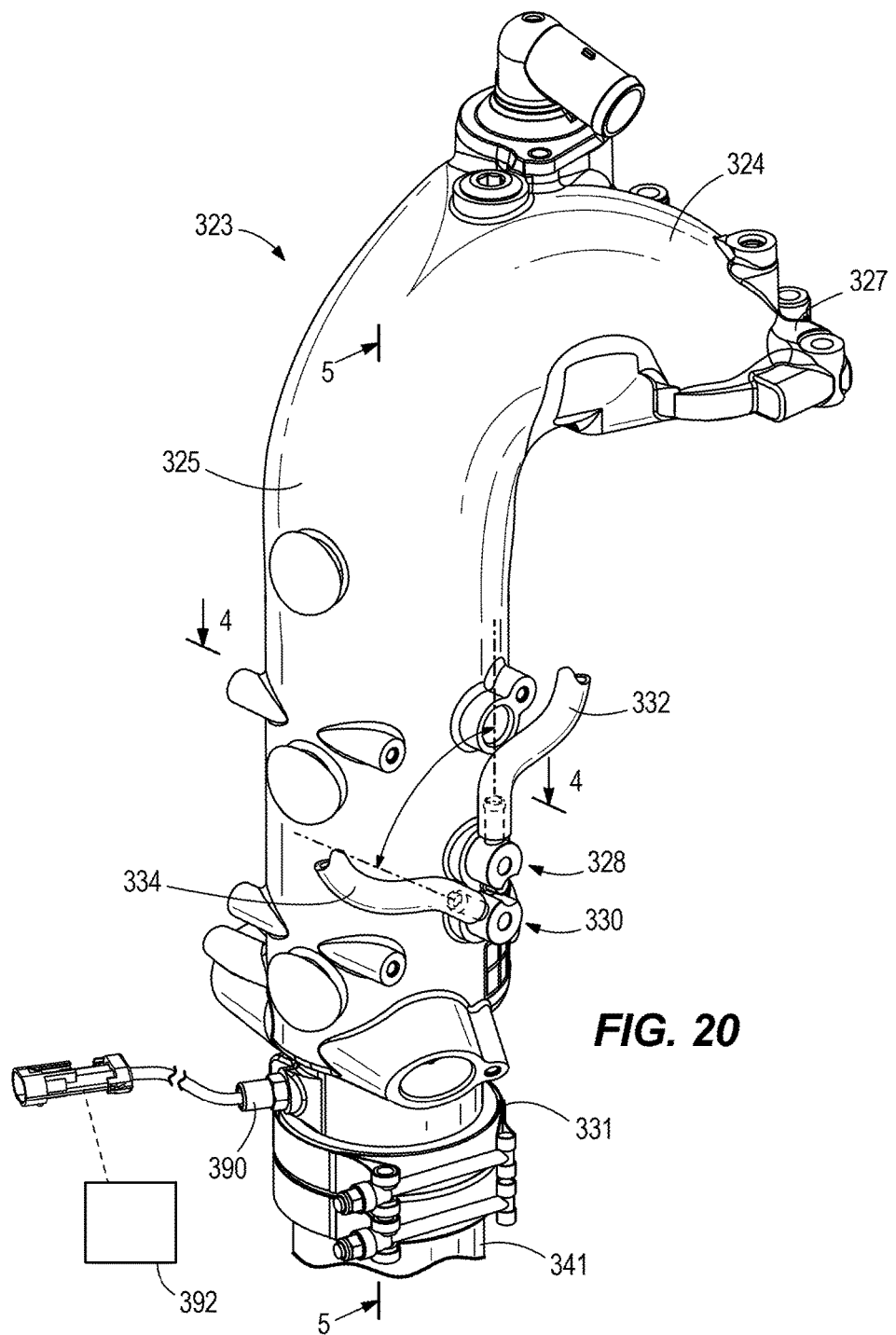

FIG. 19 is taken from U.S. Pat. No. 9,616,987 and depicts an internal combustion engine 310 configured for use in an outboard motor. The internal combustion engine 310 has a cylinder block 312 with first and second banks of cylinders 314, 316 that are disposed along a vertical axis 318 and extend transversely with respect to each other in a V-shape so as to define a valley 320 therebetween. The number and configuration of cylinders can vary from what is shown. An exhaust manifold 322 is configured to convey exhaust gas from the internal combustion engine 310. The configuration of the exhaust manifold 322 can also vary from what is shown. In the illustrated example, the exhaust manifold 322 is disposed in the valley 320 and initially conveys the exhaust gas vertically upwardly from cast-in exhaust conduits 315 on the respective banks of cylinders 314, 316, through a 180-degree bend 324, and then vertically downwardly through an elongated conduit 325, which can include a catalyst receptacle 326 having a catalyst therein for treating the exhaust gas, all as disclosed in the '987 patent.

Figure 21:
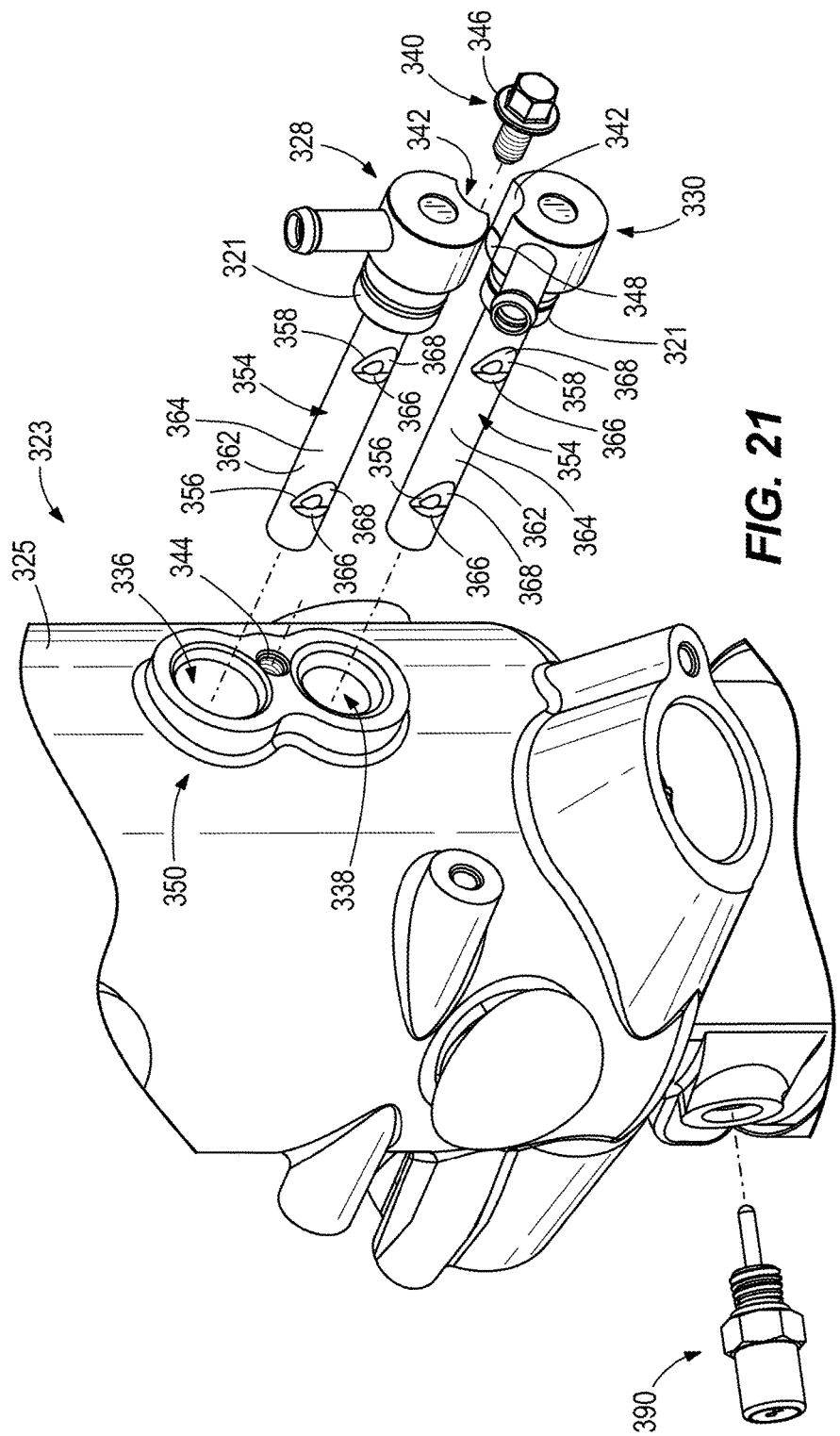
Figure 22:
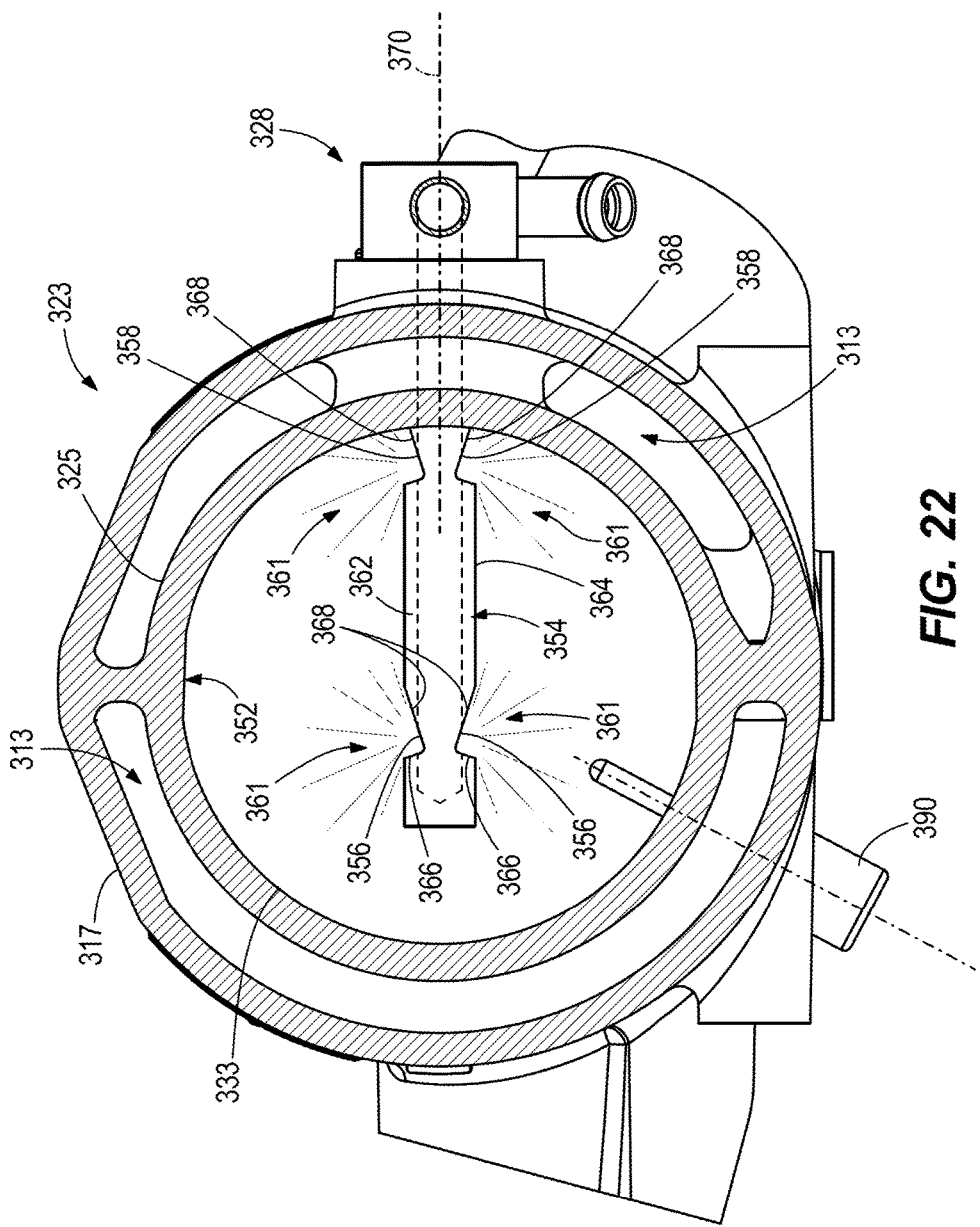
Figure 23:
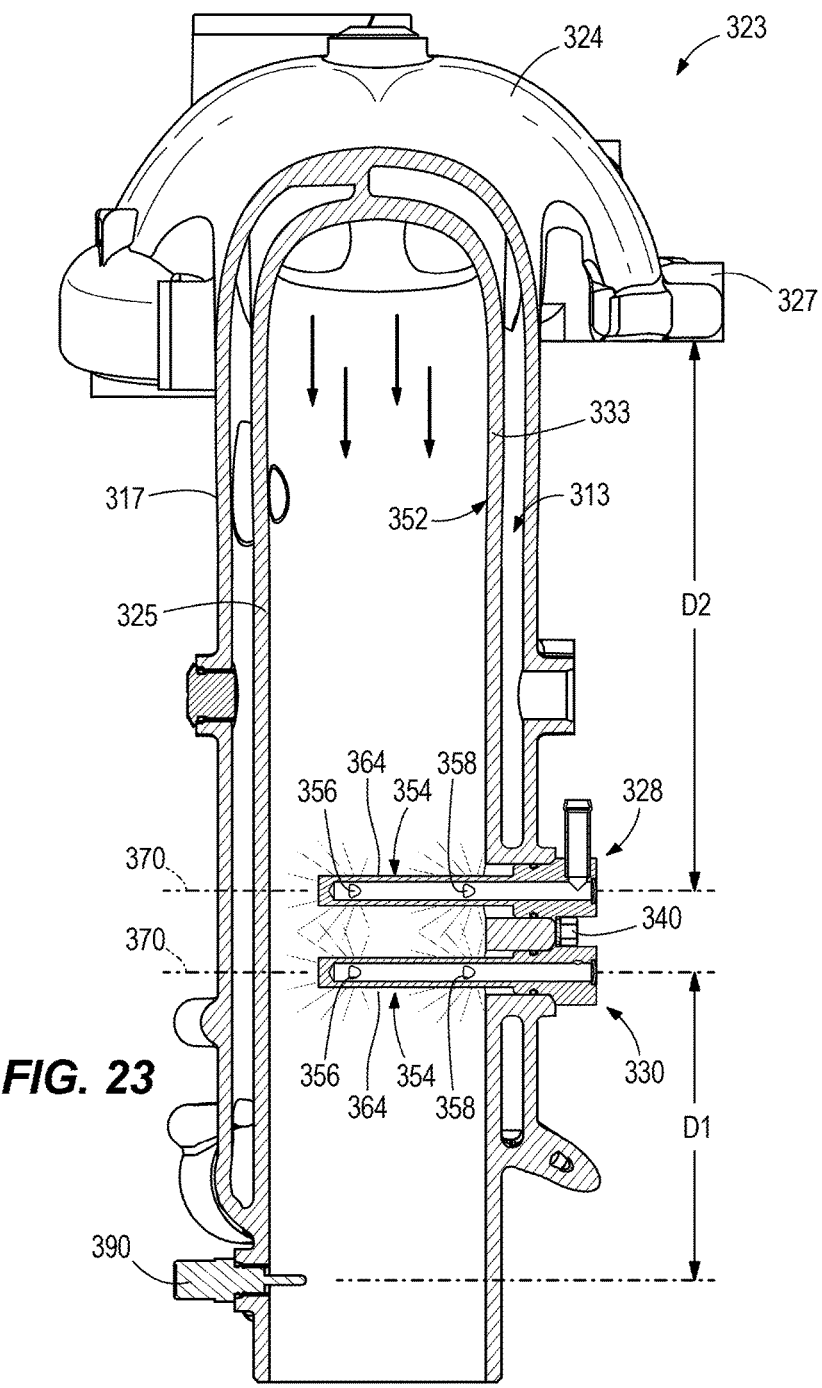

FIGS. 20-23 depict an exhaust manifold 323 for use an internal combustion engine for an outboard motor configuration, such as the exemplary internal combustion engine 310 shown in FIG. 19. Like reference numbers are used for features that are similar to the exhaust manifold 322. Similar to the example in FIG. 19, the exhaust manifold 323 has a 180-degree bend 324 and elongated conduit 325. Flanges 327 on the 180-degree bend 324 mate with upwardly-facing flanges 329 (see FIG. 19) on the cast-in conduits 315 on the first and second banks of cylinders 314, 316. As disclosed in the '987 patent, exhaust gases from the respective cast-in conduits 315 are merged in the 180-degree bend 324 and then conveyed downwardly through the elongated conduit 325. A flange 331 is mated with a downstream exhaust tube 341 to further convey the exhaust gas away from the internal combustion engine 310. As shown in FIGS. 22 and 23, a cooling jacket 317 is disposed on the exhaust manifold 323 and defines a cooling channel 313 that is configured to convey cooling water upwardly and/or downwardly alongside the exhaust manifold 323, in a heat exchange relationship with a sidewall 333 of the exhaust manifold 323 and the relatively hot exhaust gas flowing there through. Unlike the example shown in FIG. 19, the exhaust manifold 323 does not have the optional catalyst receptacle 326 and catalyst therein.

During research and experimentation, the present inventors have determined that it is desirable to cool relatively hot exhaust gases emitted from the internal combustion engine. It is desirable to do so in a reliable, uniform and complete manner by for example pumping cooling water through the channel 313 and/or by injecting the cooling water into the flow of exhaust gas at various water pressures and flow rates.

In certain systems, the present inventors have also found it to be desirable to omit portions of the cooling jacket along certain components of the exhaust system, so as to reduce the weight of the outboard motor and to free up design space for other components of the outboard motor. The cooling jacket can be omitted on components or portions of components such as the exhaust manifold, exhaust hose, muffler crossover hose, propeller shaft seal, gear case bearing carrier O-ring, and/or idle relief plenum. However omission of the cooling jacket from these components can make it more challenging to achieve the desired reliable, uniform and complete cooling, and if components of the exhaust system exceed their temperature limits, then the internal combustion engine can become incapable of running properly or other catastrophic failures can occur.

During research and experimentation, the present inventors have also found that known cooling systems for marine propulsion devices can be ineffective, particularly in arrangements where the cooling jacket is omitted from components of the exhaust system. Through research and experimentation, as further disclosed herein below, the present inventors have determined that it is possible to achieve more uniform and complete cooling of exhaust gases by using one or more cooling water injectors (sprayers) having a novel nozzle configuration with an angle-milled oblique orifice, oriented with respect to the water flow path so as to cause the flow of cooling water to form a "fan" pattern, even at relatively low pressures and under a wide range of operational conditions. Advantageously, the orifice can be sized large enough to help limit the likelihood of debris blocking, and to enable relatively easier cleaning of the nozzle, compared to the prior art. According to the present disclosure, the present inventors have found it possible to achieve better and more reliable cooling, even in components of the exhaust system where the cooling jacket is omitted. The present inventors have also determined that it can be advantageous to provide more than one cooling water sprayer, including multiple cooling water sprayers that receive cooling water from separate sources, for redundancy in case one of the cooling water sprayers become inoperable, for example due to debris blocking or other failure.

Referring now to FIGS. 20-23, a novel cooling system is provided for cooling the exhaust manifold 323 and the exhaust gas flowing through the exhaust manifold 323. In the illustrated example, the cooling system includes first and second cooling water sprayers 328, 330 that are configured to spray first and second flows of cooling water into the exhaust gas, respectively. The cooling water sprayers 328, 330 are vertically aligned (e.g., stacked) with respect to each other and with respect to the exhaust manifold 323. A first conduit 332 is connected to the first cooling water sprayer 328 and a separate, second conduit 334 is connected to the second cooling water sprayer 330. The first and second conduits 332, 334 convey the separate, first and second flows of cooling water, respectively, to the cooling water sprayers 328, 330. The first and second conduits 332, 334 are separate from each other such that the first and second flows of cooling water remain separate as they are conveyed to the respective cooling water sprayers 328, 330, in parallel. In the illustrated example, the first conduit 332 receives the first flow of cooling water via the cooling channel 313. The second conduit 334 receives the second flow of cooling water via a water fitting on the exhaust conduit 325. Optionally, each of the first and second conduits 332, 334 are provided with a conventional primary filter (not shown) configured to filter the cooling water flowing therethrough. The first and second flows of cooling water can both derive from a conventional upstream cooling water pump that pumps raw water from the body of water in which the outboard motor is operating. The raw water can be obtained from, for example, one or more conventional cooling water inlets on the gearcase of the outboard motor.

Referring to FIG. 21, the first cooling water sprayer 328 is fitted in a first radial through-bore 336 in the exhaust manifold 323. The second cooling water sprayer 330 is fitted in a second radial through-bore 338 in the exhaust manifold 323. The first and second radial through-bores 336, 338 each extend through the sidewall 333 of the exhaust manifold 323, and through the cooling jacket 317 on the sidewall 333. Optionally, the first and second radial through-bores 336, 338 can have different sizes (e.g. diameters) with respect to each other, which correspond to differently-sized base portions 321 of the cooling water sprayers 328, 330, to prevent an incorrect assembly of the cooling water sprayers 328, 330 with the exhaust manifold 323. A retainer 40 retains both of the cooling water sprayers 328, 330 with respect to the exhaust manifold 323. In the illustrated example, both of the cooling water sprayers 328, 330 have an outer circumference with a radial notch 342 in which the retainer 340, in this example a bolt, is registered, to thereby retain the cooling water sprayers 328, 330 in place. The retainer 340 has a threaded shank that is received in a threaded hole 344 located in between the first and second radial through-bores 336, 338. The retainer 340 further has an outer flange 346 that registers with radial engagement surfaces 348 located within the respective radial notches 342. Threading the retainer 340 into the threaded hole 344 sandwiches the radial engagement surfaces 348 between the outer flange 346 and a boss 350 on the exhaust manifold 323, through which the first and second radial through-bores 336, 338 are formed, thereby retaining the cooling water sprayers 328, 330 in place.

Referring to FIGS. 22 and 23, the cooling water sprayers 328, 330 are specially configured to spray the respective first and second flows of cooling water radially outwardly toward the inner diameter 352 of the sidewall 333 of the exhaust manifold 323. In certain examples, each cooling water sprayer 328, 330 is configured to spray the flow of cooling water so that a swirling flow of cooling water results, i.e. circumferentially around and spirally downwardly along the inner diameter 352. Each of the cooling water sprayers 328, 330 has an elongated sprayer body 354 that radially extends into the exhaust manifold 323 and conveys the respective flow of cooling water radially inwardly through the cooling jacket 317, through the cooling channel 313, and through the sidewall 333 of the exhaust manifold 323 and toward the interior of the conduit 325. As noted in FIGS. 21 and 22, each of the cooling water sprayers 328, 330 also has first and second pairs of diametrically-opposing nozzles 356, 358 that are each configured to spray the flow of cooling water radially outwardly in a fan-shaped pattern 361 (see FIG. 22) toward the inner diameter 352 of the radially exhaust manifold 323. The sprayer body 354 includes a cylinder 362 that radially extends into the conduit 325. As shown in FIG. 22, the flows of cooling water are sprayed radially outwardly from the nozzles 356, 358, radially outwardly from the cylinder 362. The first and second pairs of nozzles 356, 358 are spaced apart from each other along the sprayer body 354. Each of the nozzles 356, 358 have the same or roughly the same shape, size and orientation.

Figure 24:
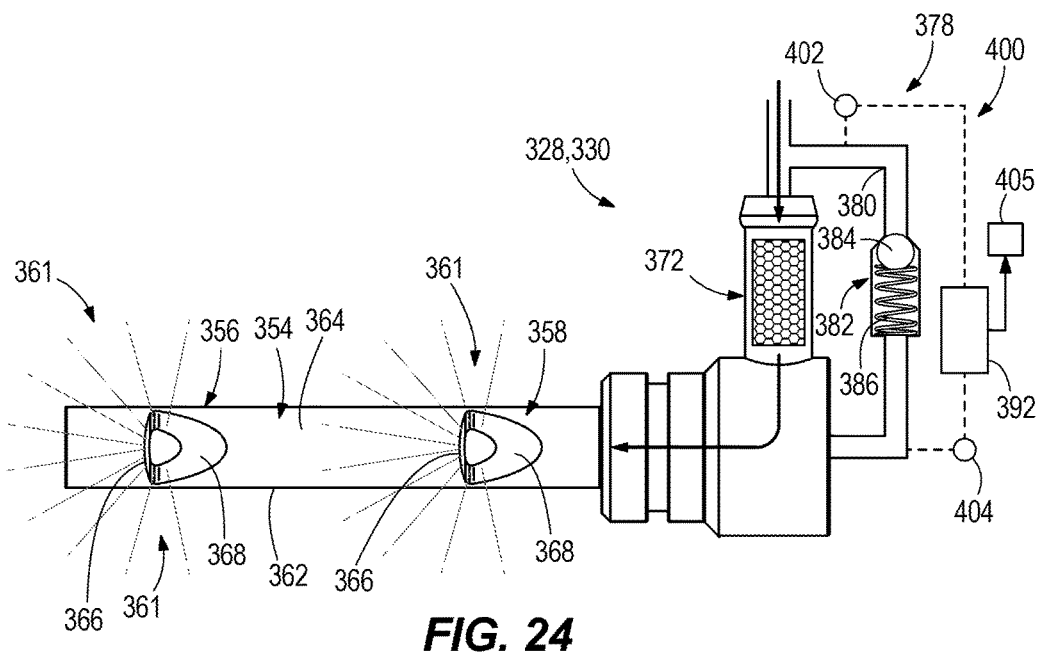
Figure 25:
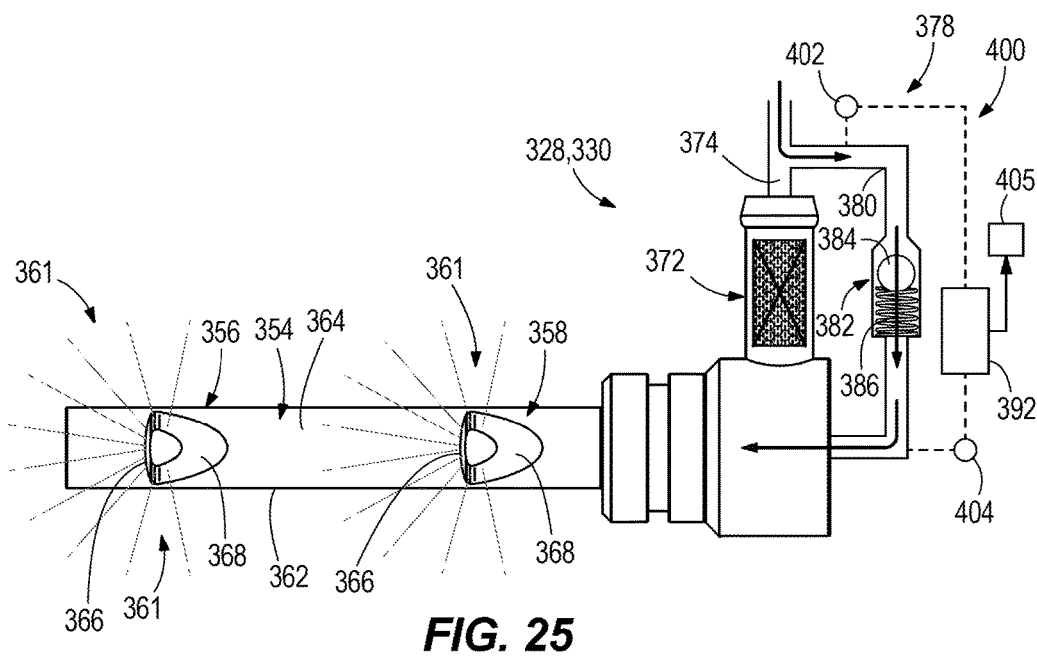

Referring to FIGS. 22, 24 and 25, the nozzles 356, 358 are defined by a tangential cutout in the outer surface of the cylinder 362. Each tangential cutout has radially extending endwall 366 upon which the flow of cooling water impinges as it flows through the cylinder 362. Each cutout also has tangentially tapered group of sidewalls 368 that extend tangentially outwardly and extend from the outer surface 364 of the cylinder 362 to the endwall 366. Each tangentially tapered group of sidewalls 368 defines a three-sided radial aperture in the cylinder 362. Stated another way, the sprayer body 354 is elongated along a sprayer body axis 370 and the endwall 366 extends approximately perpendicularly radially outwardly with respect to the sprayer body axis 370. The tangentially tapered group of sidewalls 368 extends at an approximately tangential angle to the sprayer body axis 370 and at a substantially perpendicular angle to the endwall 366. Other configurations can be employed to achieve the fan-shaped pattern 361.

During research and experimentation, the present inventors have also determined that a blockage or other failure of one or both of the cooling water sprayers 328, 330 can cause an excessively high exhaust gas temperature, which can damage the internal combustion engine and/or components thereof. A failure of the cooling water sprayers 328, 330 can result from impassible debris from the inlet port of the cooling system and/or impassible debris that is built up and liberated from inside the cooling system. As such, the present inventors have determined that it would be desirable to provide a filter arrangement with a bypass mechanism that facilitates continued flow of cooling water in the event that the filter becomes clogged with debris or otherwise fails. Such a system can optionally have an indicator for identifying an impending or actual bypass condition of the filter to a user/operator.

FIGS. 24-25 and 26-27 depict alternate examples of the cooling water sprayers 328, 330. Each of the depicted examples has a filter 372 that is incorporated with the respective cooling water sprayer 328, 330 and configured to filter the respective flow of cooling water. In each of the examples, the filter 372 is disposed in the respective sprayer body 354. The sprayer body 354 has an inlet 374 that conveys the flow of cooling water to the filter 372, and then on to the respective first and second pairs of nozzles 356, 358, and a bypass mechanism 378 that conveys the flow of cooling water around the filter 372 when the filter 372 becomes clogged with debris. The configuration of the bypass mechanism 378 differs in the respective examples and is further disclosed with reference to each example herein below.

In the example shown in FIGS. 24 and 25, the bypass mechanism 378 includes a bypass passageway 380 that extends parallel to the flow of cooling water from the inlet 374 to the sprayer body 354. A one-way check valve 382 is disposed in the bypass passageway 380, and is normally closed, as shown in FIG. 24. In the illustrated example, a check ball 384 is biased into a seated position by a compression spring 386, which closes the bypass passageway 380. When the filter 372 becomes clogged with debris, as shown in FIG. 25, pressure from the flow of cooling water builds up and forces the check ball 384 out of the seated position, against the bias of the compression spring 386. Thus, the bypass mechanism 378 allows continued flow of cooling water through the bypass passageway 380 despite a clogged condition of the filter 372. The resiliency of the compression spring 386 can be selected by the designer of the system to provide a certain range of restriction, above various normal operating pressures of the cooling water.

Optionally, the bypass mechanism 378 can include an indicator device 400 for indicating to the operator that the filter 372 has become clogged, requiring flow of cooling water through the bypass passageway 380. The exact configuration of the indicator device 400 can vary. In the example shown in FIGS. 24 and 25, the indicator device 400 indicates when the one-way check valve 382 is caused to open. Specifically, the indicator device 400 is actuated based upon a change in pressure differential in the bypass passageway 380. First and second pressure sensors 402, 404 are located upstream and downstream of the one-way check valve 382. Each of the first and second pressure sensors 402, 404 send a pressure signal to a controller 392, which is configured to compare the respective pressure signals and calculate the pressure differential across the one-way check valve 382. The controller has a programmable processor and a memory that stores pressure differentials or pressure differential limits or ranges corresponding to open and closed positions of the one-way check valve 382. The controller 392 is configured to compare the actual pressure differential across the one-way check valve 382 to the pressure differentials in the memory. Based on the comparison, the controller 392 is configured to control, for example a visual display or auditory alarm 405, to thereby indicate an open state of the one-way check valve 382, informing the operator that the filter 372 has become clogged.

Figure 26:
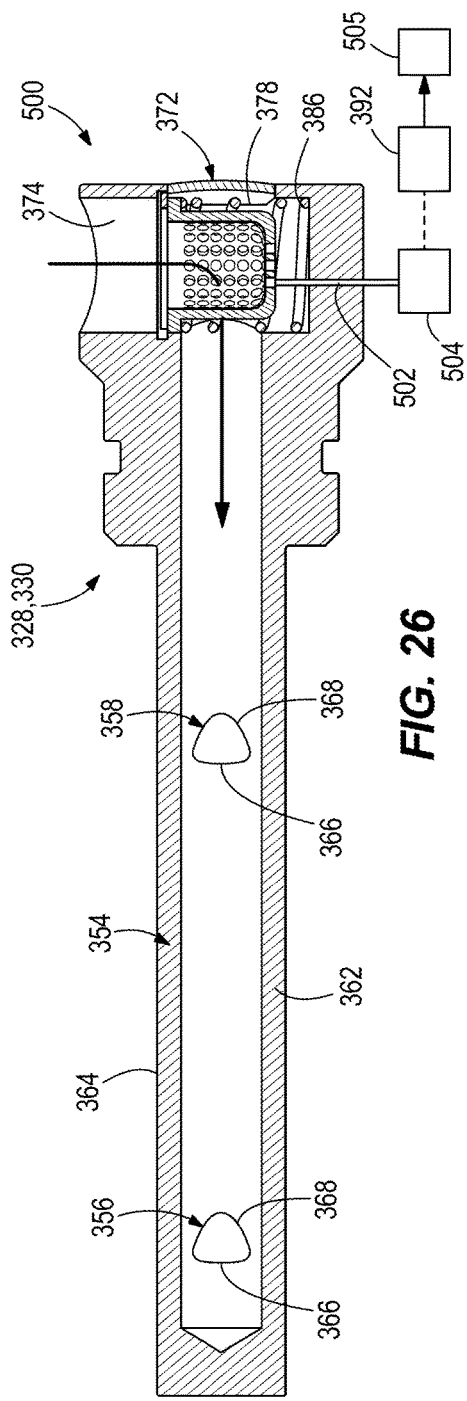
Figure 27:
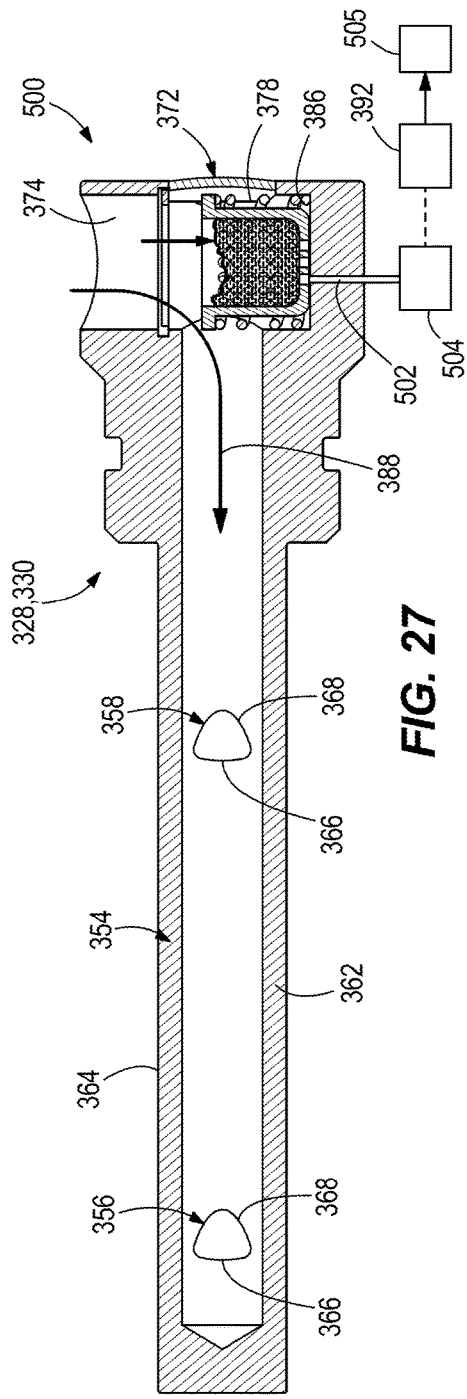

In the example shown in FIGS. 26 and 27, the filter 372 is normally biased by a compression spring 386 into a seated position, see FIG. 26. In this state, the flow of cooling water passes through and is filtered by the filter 372. When the filter becomes clogged with debris, see FIG. 27, pressure from the flow of cooling water builds up and causes the filter 372 to move into an unseated position wherein continued flow of cooling water past the filter 372 (i.e. bypassing the filter 372) is permitted, see arrow 388. In this example, the filter 372 is a basket that is normally biased into the seated position by the compression spring 386. Thus, the bypass mechanism 378 allows continued flow of cooling water despite a clogged condition of the filter 372. The resiliency of the compression spring 386 can be chosen by the designer of the system to provide a certain range of restriction, above various normal operating pressures of the cooling water. Optionally, the sprayer body 354 can have a transparent or translucent window that facilitates visual identification of the filter 372 in bypass mode.

Optionally, the example shown in FIGS. 26 and 27 can further include an indicator device 500 that indicates when the filter 372 has been caused to move from the first position shown in FIG. 26 to the second position shown in FIG. 27. The type of indicator device 500 can vary from what is shown. In the illustrated example, the indicator device 500 includes an extension member 502 that is caused to protrude from the sprayer body 354 when the filter 372 moves from the first position to the second position, compare FIGS. 26 and 27. Thus, the extension member 502 visually indicates to an operator that the filter 372 has been caused to move from the first position to the second position. Optionally, the extension member 502 actuates a mechanical or electrical switch 504. The switch 504 is in communication with the controller 392, which as described in the example of FIGS. 24 and 25, is configured to control a visual or auditory alarm device 505. In this example, the controller 392 is configured to control the alarm device 505 based upon an actuation of the switch 504 to thereby indicate to an operator that the filter 372 has moved into the second position shown in FIG. 27, and thus the filter 372 has become clogged.

Thus, according to examples disclosed herein, the cooling water system for the outboard motor has redundant sprayers and filters, which provide an added layer of protection against a loss of function. Each sprayer 328, 330 is fed by an independent water source which protects the system from external and internal contamination clogging the sprayers 328, 330. The sprayers 328, 330 are stacked on top of each other and spray into the exhaust gas. To ensure the sprayers 328, 330 are installed correctly, the sprayer bodies 354 are configured so that one retainer 340 can be used to hold both sprayers 328, 330 in their intended position. The sprayer bodies 354 have bases 321 having different diameters to "poke-a-yoke" their installation with the correct throughbores 336, 338. The radial notch 342 in each sprayer body 354 allows the retainer 340 to hold the sprayer bodies 354 in position and maintain their rotation.

Referring now to FIGS. 20-23, an exhaust gas temperature sensor 390 is disposed in the conduit 325 at a location downstream of the cooling water sprayers 328, 330. The exhaust gas temperature sensor 390 is configured to sense temperature of the exhaust gas and cooling water mixture. The type of exhaust gas temperature sensor can vary and can include any one of a number of commercially available exhaust gas temperature sensors, for example Exhaust Gas High Temperature Sensors, sold by Amphenol. During research and experimentation, the present inventors have determined that the cooling water sprayers 328, 330 must be placed a sufficient distance D1 (see FIG. 23) above the bottom of the cooling water jacket to allow the spray pattern 361 to fully develop. This ensures that all non-water-jacketed components downstream of the cooling water sprayers 328, 330 remain below their respective temperature limits.

The present inventors have also determined that the orientation of the cooling water sprayers 328, 330 to the exhaust gas temperature sensor 390 is important. For example, the inventors have found that there should be an angle that is substantially offset from parallel with the cooling water sprayers 328, 330 and the orientation of the exhaust gas temperature sensor 390 to achieve accurate temperature readings from the exhaust gas temperature sensor 390. This is because the mixture of the cooling water and exhaust gas typically is not uniformly distributed inside the exhaust manifold 323, but will vary depending on operating conditions. The present inventors have also found that the distance D2 between the first and second exhaust sprayers 328, 330 and the 180 degree bend 324 should be large enough to prevent cooling water reversion in the exhaust manifold 323, i.e. flow of cooling water backwardly into the first and second banks of cylinders 314, 316.

In the illustrated example, the exhaust gas temperature sensor 390 radially extends into the exhaust manifold 323 and is positioned downstream with respect to the cooling water sprayers 328, 330 and close enough to the cooling water sprayers 328, 330 so that the first and second pairs of nozzles 356, 358 spray at least a portion of the respective first and second flows of cooling water onto the exhaust gas temperature sensor 390 under nominal flow conditions. In other words, the temperature sensor 390 radially extends into the exhaust manifold 323 and is positioned downstream of and within a spray pattern of the respective cooling water sprayers 328, 330 under nominal conditions. The temperature sensor 390 is thus specially positioned with respect to the cooling water sprayers 328, 330 so that if the respective first and/or second cooling water sprayer 328, 330 becomes at least partially blocked by debris, the respective first and/or second cooling water sprayer 328, 330 does not spray cooling water onto the exhaust gas temperature sensor 390 under nominal flow conditions. Thus, the system is designed to safely operate with one sprayer completely blocked, one sprayer completely blocked and the other sprayer partially blocked, or both sprayers partially blocked.

In the illustrated example, the present inventors have realized that the exhaust gas temperature sensor 390 is the closest non-water-jacketed component to the cooling water sprayers 328, 330. Thus, the present inventors have realized that the exhaust gas temperature sensor 390 can serve as an indicator of a loss of function of the cooling water sprayers 328, 330. Thus the cooling system can includes the controller 392 that is configured to identify a fault condition associated with the cooling water sprayers 328, 330 based upon the temperature of the exhaust gas and cooling water mixture sensed by the exhaust gas temperature sensor 390. Based upon the temperature sensed by the exhaust gas temperature sensor 390, the controller 392 is programmed to determine a loss of functionality of one or both of the cooling water sprayers 328, 330. The system is thus capable of safe operation with one sprayer completely blocked, one sprayer completed blocked and the other sprayer partially blocked, or both sprayers partially blocked. In certain examples, the controller 392 has a programmable processor and a memory that contains a lookup table of allowable exhaust gas temperature values or a range of allowable exhaust gas temperature values. If the temperature sensed by the exhaust gas temperature sensor 390 falls outside the allowable exhaust gas temperature values, the controller 392 is programmed to infer that a fault condition exists. Optionally the controller 392 can further be programmed to alter an operational characteristic of the outboard motor when a loss of functionality occurs, such as limiting available engine power to a set point that yields an exhaust gas temperature that is suitable to all downstream components, while continuing to allow the outboard motor to operate.

FIGS. 28-34 depict further embodiments for an exhaust system according to the present disclosure. In particular, the figures disclose an exhaust system 100 for a marine propulsion device 600 having an internal combustion engine 602 and a driveshaft housing 604, as previously discussed. The exhaust system 610 conveys exhaust gas away from the internal combustion engine 602, which flows from an upstream end 621 to a downstream end 622 within an exhaust manifold 620. The downstream end 622 of the exhaust manifold 620 has an outer surface 625 and an inner surface 624. The exhaust system 610 further includes an exhaust conduit 630 that conveys the exhaust gas between the exhaust manifold 620 and the driveshaft housing 604. The exhaust conduit 630 has an upstream end 631 and a downstream end 632 and is comprised of an outer surface 635 and an inner surface 634. In the embodiment shown, the downstream end 632 is closer to the driveshaft housing 604 than to the exhaust manifold 620. Likewise, the upstream end 631 of the exhaust conduit 630 is proximal to the downstream end 622 of the exhaust manifold 620.

Figure 28:
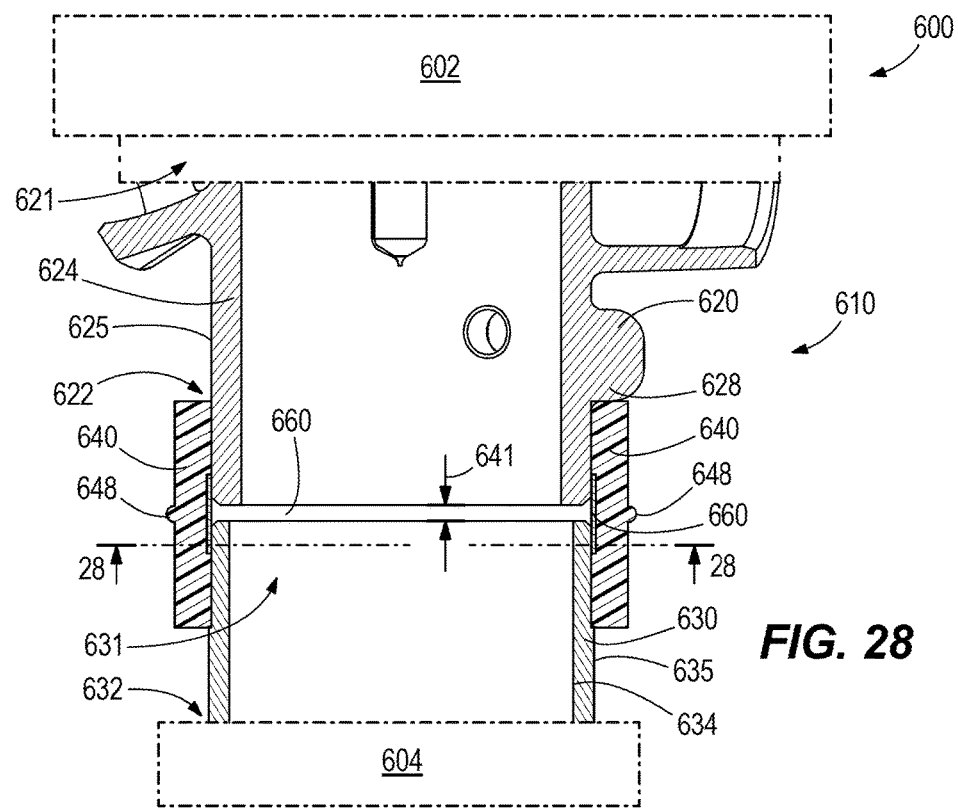
Figure 29:
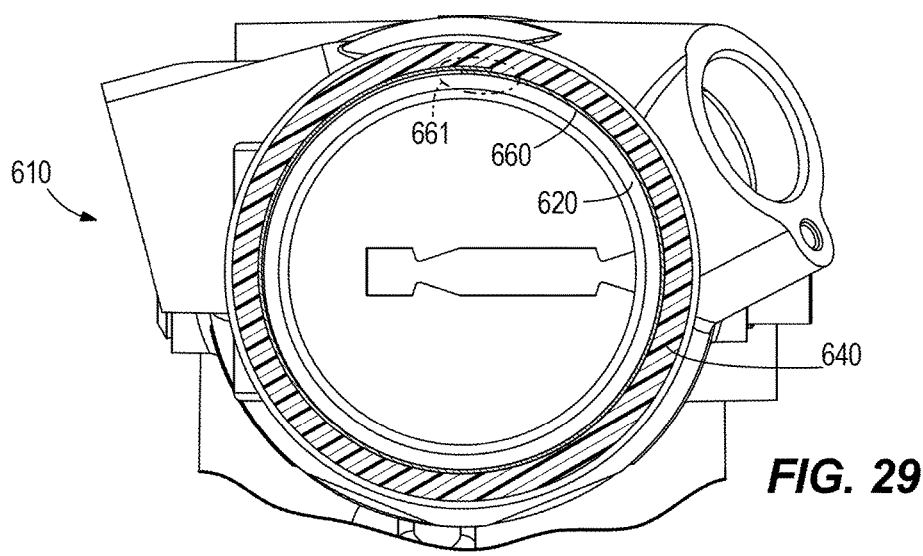

As can further be seen in FIG. 28, a flexible coupler 640 having an outer surface 645 and an inner surface 644 couples the downstream end 622 of the exhaust manifold 620 to the upstream end 631 of the exhaust conduit 630 such that exhaust gas flows therethrough. A gap 641 is retained between the downstream end 622 of the exhaust manifold 620 and the upstream end 631 of the exhaust conduit 630. In certain embodiments, the gap 641 is 3.0 mm. Some embodiments also provide a ledge 628 on the exhaust manifold 620 (and/or exhaust conduit 630) to position the flexible coupler 640 thereon.

Through experimentation and development, the present inventors have identified that, by virtue of the exhaust manifold 620 being fixed relative to the internal combustion engine 602, and the exhaust conduit 630 being fixed relative to the driveshaft housing 604, it is desirable to avoid a rigid connection between the exhaust manifold 620 and the exhaust conduit 630. More specifically, the present inventors have identified that the effects of component tolerances, and also the retraction and expansion of components during different operational states, generates issues when the exhaust manifold 620 is rigidly coupled to the exhaust conduit 630. In particular, these effects can cause damage to the exhaust system 610 when the exhaust manifold 620 and exhaust conduit 630 are rigidly coupled. The same effects of production tolerances (i.e. part variation), as well as engine operation and different heating states caused through operation, provide that the exhaust manifold 620 and the exhaust conduit 630 do not necessarily remain coaxial during all operational states.

Therefore, a mechanism for flexibly coupling the exhaust conduit 630 to the exhaust manifold 620 is desired. However, the present inventors have further identified that the high temperatures of air and water within the exhaust system 610 precludes the use of flexible couplers known in the art for operatively coupling the exhaust manifold 620 to the exhaust conduit 630. Moreover, even where cooling sprayers are provided within the exhaust system 610, as discussed at length above, the present inventors have identified that non-uniform flow turbulence and non-uniform temperatures remain present throughout the exhaust system 610. While this may be tolerable within the exhaust manifold 620 or the exhaust conduit 630 individually, any "hot spots" quickly deteriorate any flexible couplers known in the art when provided between the exhaust manifold 620 and the exhaust conduit 630.

Therefore, the present inventors have identified the need to develop a flexible coupling system capable of conveying exhaust gas between the exhaust manifold 620 and the exhaust conduit 630—with a gap 641 retained therebetween that necessarily exposes the flexible coupler—that can survive these non-uniform conditions. Accordingly, the presently disclosed exhaust system 610 further includes a metallic coil 660 that is coaxially aligned (axis MA) with and protects a flexible coupler 640 (axis FA) while coupling the exhaust manifold 620 to the exhaust conduit 630. One exemplary embodiment of the metallic coil 660 and the flexible coupler 640 is shown through FIGS. 30A-C. As further shown in FIGS. 31-34, the flexible coupler 640 biases the metallic coil 660 into contact with both the outer surface 625 of the exhaust manifold 620, and the outer surface 635 of the exhaust conduit 630. In certain embodiments, the exhaust manifold 620, exhaust conduit 630, and metallic coil 660 are made of aluminum, including embodiments wherein the exhaust manifold 620 and the exhaust conduit 630 are also aluminum. In this manner, engagement of metallic coil 660 with both the exhaust manifold 620 and the exhaust conduit 630 provides conduction of heat therebetween. However, other embodiments of metallic coils 660 are made of bronze or copper, for example. The metallic coil 660 is also hand anodized in certain embodiments to further protect against corrosion.

The present inventors have identified that the metallic coil 660 must be thick enough to withstand the heat transfer between the exhaust conduit 630 and the exhaust manifold 620, as well as to the exposure to the exhaust gas and cooling spray. However, the metallic coil 660 must also be thin enough to flex and coil as necessary to retain contact with both the exhaust conduit 630 and the exhaust manifold 620, accommodating radial and height (i.e. gap 641) tolerances therebetween. In certain embodiments, the metallic coil 660 has a thickness of 0.76 mm (between inner face 664 and outer face 665) and a height of 26.0 mm (between upstream end 666 and downstream end 667) when made of aluminum and coupling aluminum exhaust manifolds 620 and exhaust conduits 630 with a 3.0 mm nominal gap therebetween.

Figure 34:
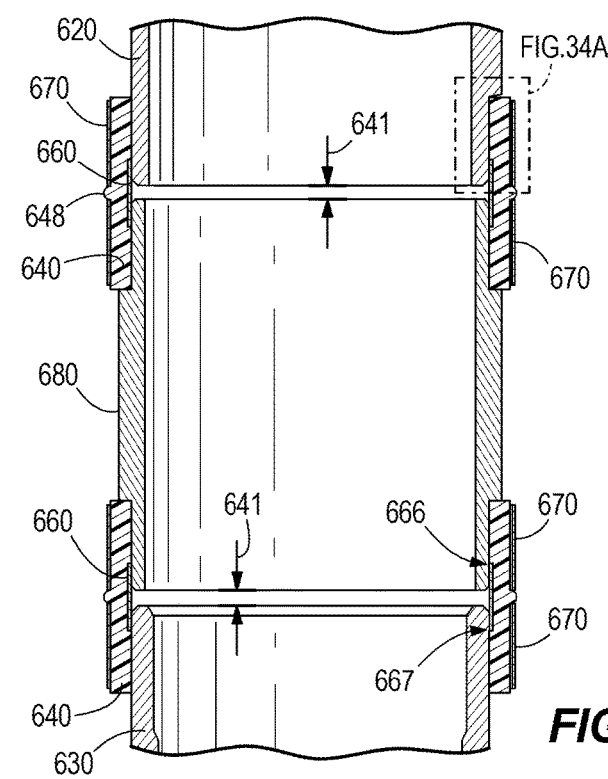
Figure 34A:
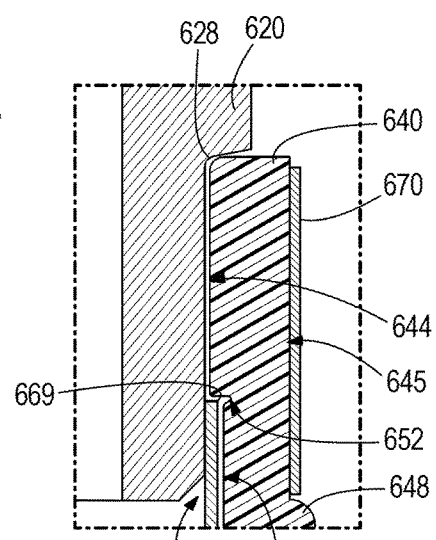
FIG. 34A is a detailed view taken from FIG. 34.

The exhaust system 610 further includes a pair of clamps 670 that engage the outer surfaces 645 of the flexible coupler 640. A first clamp 670 causes the inner surface 644 of the flexible coupler 640 to sealingly engage with the outer surface 625 of the exhaust manifold 620, and a second clamp 670 causes the inner surface 644 of the flexible coupler 640 to engage at an opposite end of the flexible coupler 640 with the outer surface 635 of the exhaust conduit 630. In certain embodiments, such as shown in FIG. 34, the flexible coupler 640 has one or more ledges 648 for positioning the clamps 670 thereon.

In certain embodiments, the flexible coupler 640 is made of a seventy durometer silicone material, though other flexible materials are also anticipated by the present disclosure, such as neoprene. Likewise, certain embodiments provide that the pair of clamps are hose clamps having a track 674 and a screw 672 for tightening and loosening the clamp 670 in the manner known in the art (see FIGS. 32-34). As another example, other embodiments constant tension T-bolt clamps in addition to, or instead of typical hose clamps. In such cases, the spring tension maintains the loading of the clamp, as known in the art.

Figure 30A:
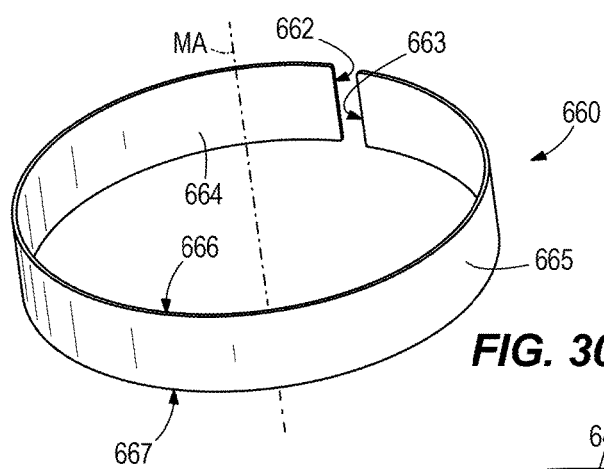
FIGS. 30A-C are perspective views of a metallic coil, a flexible coupler, and a coupled assembly according to the present disclosure.
Figure 30C:
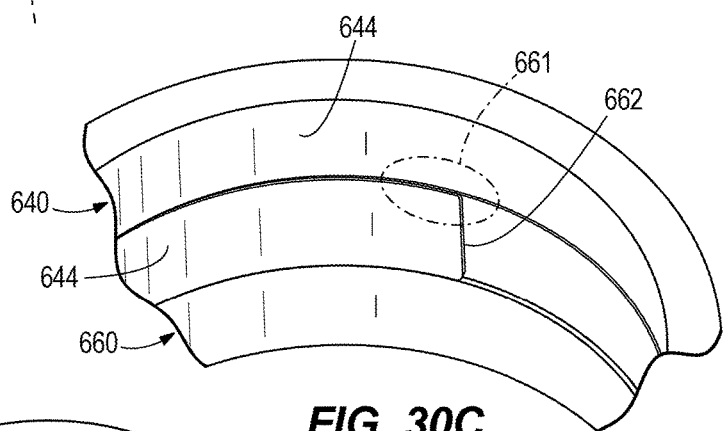
Figure 30B:
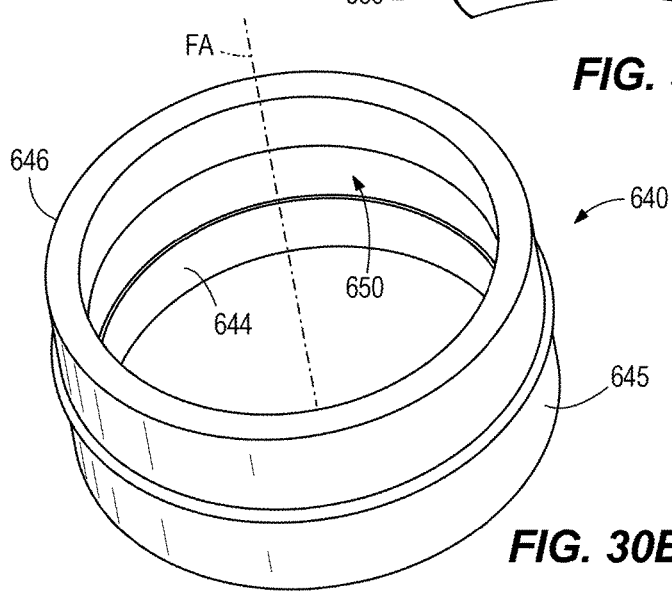
Figure 31:
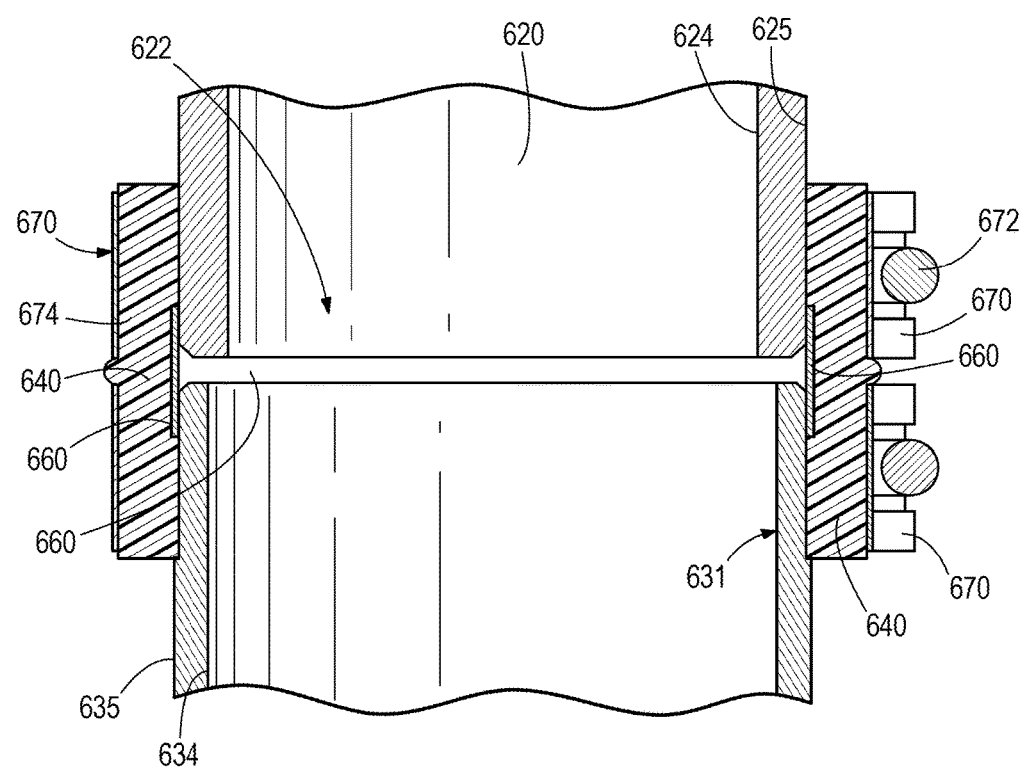

As shown in FIGS. 30A-30C, certain embodiments provide that the metallic coil 660 has a first end 662 opposite a second 663, whereby the first end 662 slidably overlaps the second end 663 to form a ring of variable circumference (overlap 661). In this manner, as the clamp 670 is tightened around the flexible coupler 640, the metallic coil 660 is allowed to slide on top of itself to maintain uniform contact with the exhaust manifold 620 and the exhaust conduit 630. This is in contrast to a rigid ring of uniform circumference, which requires tighter tolerance controls (i.e. less variation) for the exhaust manifold 620 and the exhaust conduit 630. Moreover, the present inventors have identified that use of a rigid ring would create non-uniform compression (creating gaps where "pinching" occurs) when a clamp 670 is tightened, causing the metallic coil 660 to be compressed to a smaller circumference than its native rigid circumference.

In certain embodiments, such as that shown in FIG. 30C, the flexible coupler 640 defines a radial channel 650 within the inner surface 644 that is configured to retain the metallic coil 660 therein. In this manner, the radial channel 650 prevents axial movement of the metallic coil 660 (i.e., towards the exhaust manifold 620, or towards the exhaust conduit 630) relative to the flexible coupler 640. This feature assists in retaining alignment of the metallic coil 660 over the gap 641 provided between the exhaust manifold 620 and the exhaust conduit 630 such that, notwithstanding expansion or contraction of the exhaust manifold 620 or the exhaust conduit 630, the metallic gap 660 remains engaged with each and continues conducting heat therebetween. In certain embodiments, the metallic coil 660 is not centered over the gap 641, but positioned upstream or downstream, for example to anticipate non-uniform expansion between the exhaust manifold 620 and the exhaust conduit 630. It should be recognized that by contacting both the exhaust manifold 620 and the exhaust conduit 630, the metallic coil 660 further prevents any non-uniform temperature or non-uniform flow in the exhaust gas or in a cooling spray within the exhaust system 610 for making direct contact with the flexible coupler 640. This extends the life of the flexible coupler 640 by preventing the "hot spots" previously discussed.

To demonstrate further embodiments, the metallic coil 660 is characterized as having an upstream end 666 opposite a downstream end 667, and an inner face 664 opposite an outer face 665. The inner face 664 and outer face 665 each extend between the first end 662 and the second end 663, and each extend from the upstream end 666 to the downstream end 667. Further, the flexible coupler 640 defines a pair of cavities 652 within the radial channel 650, as shown in FIG. 34. Each of the cavities 652 is recessed further from the inner surface 644 of the flexible coupler 640 than the remaining radial channel 650. In this regard, the pair of cavities 652 prevent the outer face 665 of the upstream end 666, as well as the outer face 665 of the downstream end 667, from contacting the inner surface 644 of the flexible coupler 640. In other words, the pair of cavities 652 prevent the corners 669 of the metallic coil 660 from cutting into, thereby damaging, the flexible coupler 640 as the exhaust manifold 620 and the exhaust conduit 630 expand or contract, as previously discussed. In other embodiments, the upstream end 666 and downstream end 667 are rounded to prevent this cutting action of the flexible coupler 640.

Figure 32:
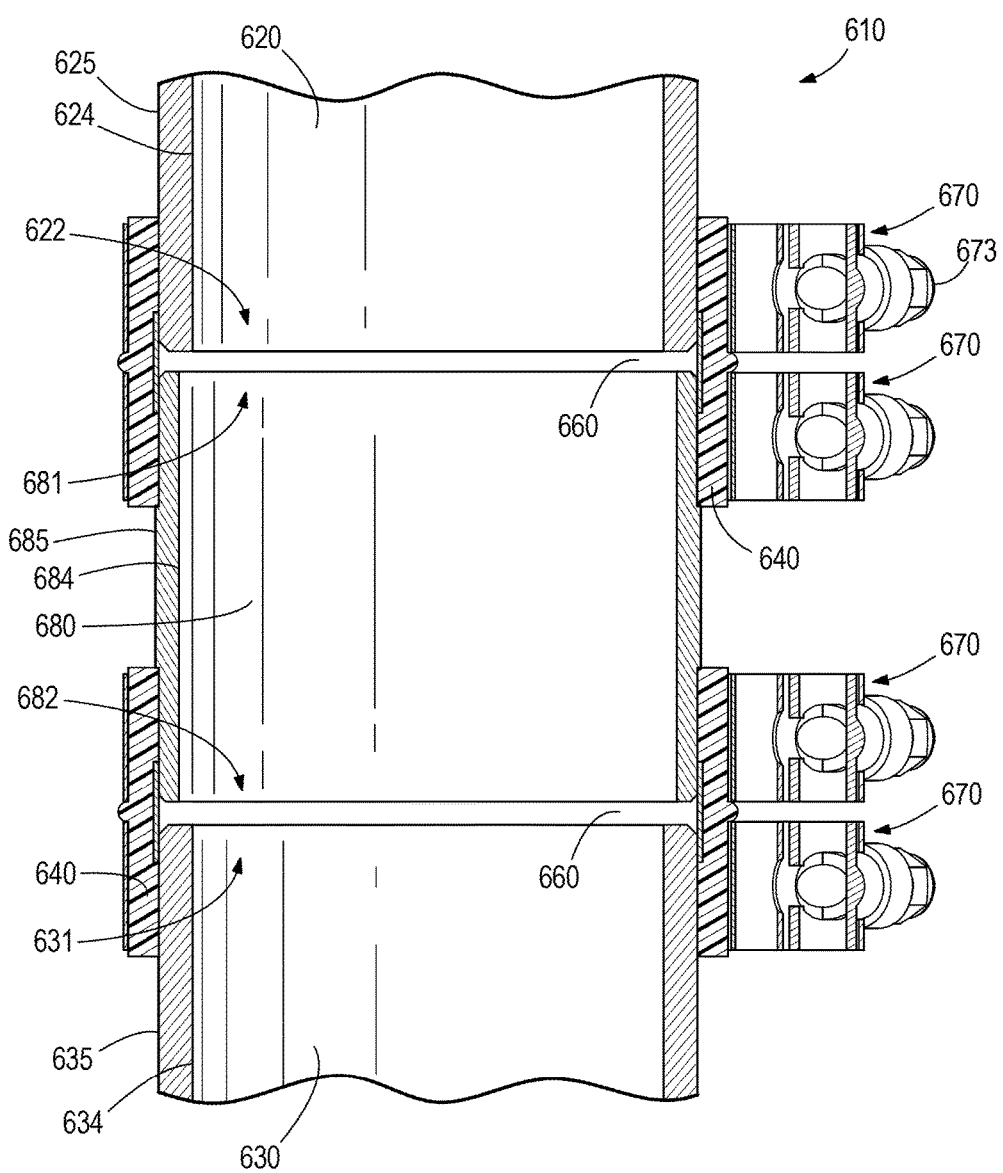
Figure 33:
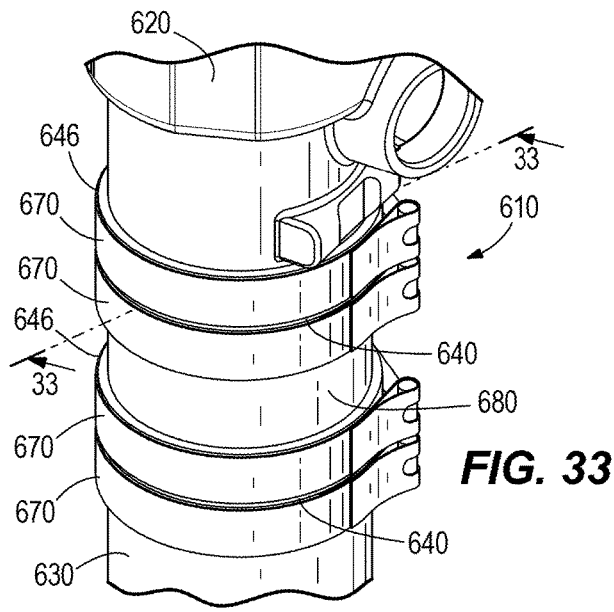

FIGS. 32-34 depict further embodiments of the present disclosure relating to the exhaust system 610, including those having an intermediate exhaust conduit 680. In certain marine propulsion devices, an intermediate exhaust conduit 680 is provided to permit the same exhaust manifold 620, and/or the same exhaust conduit 630 (or other elements coupled to the driveshaft housing 604) to be used across a variety of models. In this regard, different intermediate exhaust conduits 680 can be incorporated as necessary to provide the proper length between common elements. In the embodiment shown, one such intermediate exhaust conduit 680 is provided between the exhaust manifold 620 and the exhaust conduit 630. Similar to that previously discussed with respect to embodiments not having an intermediate exhaust conduit 680, a gap 641 (see FIG. 34) is provided between the exhaust manifold 620 and the intermediate exhaust conduit 680, as well as between the intermediate exhaust conduit 680 and the exhaust conduit 630. This allows for expansion of the exhaust manifold 620, intermediate exhaust conduit 680, and/or exhaust conduit 630, as well as any changes to the axial alignment of any of these elements.

In embodiments incorporating an intermediate exhaust conduit 680, two flexible couplers 640 and two metallic coils 660 are provided, corresponding to the two gaps 641. Likewise, two sets or pairs of clamps 670 are provided, two clamps 670 for clamping one flexible coupler 640 onto the intermediate exhaust conduit 680 to the exhaust manifold 620, and two clamps 670 for clamping one flexible coupler 640 onto the intermediate exhaust conduit 680 and the exhaust conduit 630. In the embodiment shown in FIG. 32, the clamps 670 are T-bolt clamps, as known in the art.

In this manner, the same systems previously discussed can be used to provide for flexible coupling between the exhaust manifold 620 and any number of exhaust conduits between the exhaust manifold 620 and the driveshaft housing 604.

Through experimentation and development, the present inventors have further identified that the presently disclosed systems, including integration of a metallic coil 660 within the flexible coupler 640, further protect against damage from exhaust gas pulses emanating from the internal combustion engine 602. Specifically, the present inventors identified that such pulses fatigue the elastomeric materials of the flexible coupler 640, causing them to fail. By incorporating the metallic coil 660 into the presently disclosed exhaust system 610, the flexible coupler 640 is shielded from such pulses. In addition to this shielding and also preventing the flexible coupler 640 from overheating, the metallic coil 660 also provides the conduction of heat between the exhaust manifold 620 and the exhaust conduit 630, despite having no rigid connection between them. This allows for a higher engine speed or load by an operator of the marine propulsion device without the risk of failure to the exhaust system 610. Moreover, the ability to provide a stable and robust flexible coupling system permits the manufacturers of the exhaust manifold 620, exhaust conduit 630, and/or any intermediate exhaust conduit 680 to have reduced tolerances in both vertical dimension and also in diameter, as the slip-style metallic coil 660, along with the flexible nature of the flexible coupler 640, provide that minor differences in these dimensions can be accommodated.

What is claimed is:

1. An exhaust system for a marine propulsion device comprising an internal combustion engine and a driveshaft housing, the exhaust system comprising:
   an exhaust manifold that conveys exhaust gas from the internal combustion engine, the exhaust manifold having a downstream end with an outer surface;
   an exhaust conduit that conveys the exhaust gas between the exhaust manifold and the driveshaft housing, the exhaust conduit having an upstream end with an outer surface;
   a flexible coupler having an outer surface and an inner surface, the flexible coupler coupling the downstream end of the exhaust manifold and the upstream end of the exhaust conduit such that a gap is retained between the downstream end of the exhaust manifold and the upstream end of the exhaust conduit;

a metallic coil coaxially aligned with the flexible coupler, wherein the flexible coupler biases the metallic coil into contact with both the outer surface of the exhaust manifold and the outer surface of the exhaust conduit;

a first clamp engaging the outer surface of the flexible coupler such that the inner surface of the flexible coupler sealingly engages with the outer surface of the exhaust manifold; and a second clamp engaging the outer surface of the flexible coupler such that the inner surface of the flexible coupler sealingly engages with the outer surface of the exhaust conduit;

wherein the metallic coil is configured such that when in contact with both the outer surface of the exhaust manifold and the outer surface of the exhaust conduit, the metallic coil shields the flexible coupler from the exhaust gas and also conducts heat between the exhaust manifold and the exhaust conduit.

2. The exhaust system according to claim 1, wherein the flexible coupler comprises silicone, and wherein the metallic coil comprises aluminum.

3. The exhaust system according to claim 1, wherein the first clamp and the second clamp are independent hose clamps.

4. The exhaust system according to claim 1, wherein the metallic coil has a first end and a second end that is opposite the first end, and wherein the first end slideably overlaps the second end such that a ring of variable circumference is formed.

5. The exhaust system according to claim 1, wherein the flexible coupler defines a radial channel within the inner surface that retains the metallic coil therein to prevent axial movement of the metallic coil relative to the flexible coupler.

6. The exhaust system according to claim 1, wherein the flexible coupler is made of seventy durometer silicone and wherein the metallic coil is made of aluminum, wherein the metallic coil has an upstream end and a downstream end that is opposite the upstream end, wherein the metallic coil has an inner face and an outer face that is opposite the inner face, each extending from the first end to the second end and each extending from the upstream end to the downstream end.

7. The exhaust system according to claim 6, wherein the metallic coil has a thickness of 0.76 mm between the inner face and the outer face and a height of 26.0 mm between the upstream end and the downstream end.

8. The exhaust system according to claim 1, and wherein the metallic coil has an upstream end and a downstream end that is opposite the upstream end, wherein the metallic coil has an inner face and an outer face that is opposite the inner face, each extending from the first end to the second end and each extending from the upstream end to the downstream end, and wherein the flexible coupler further defines a pair of cavities within the radial channel such that the outer face of the upstream end and the outer face of the downstream end are prevented from contacting the inner surface of the flexible coupler.

9. An exhaust system for a marine propulsion device comprising an internal combustion engine and a driveshaft housing, the exhaust system comprising:

an exhaust manifold that conveys exhaust gas from the internal combustion engine, the exhaust manifold having a downstream end with an outer surface;

a first exhaust conduit that conveys the exhaust gas from the exhaust manifold, the first exhaust conduit having an upstream end and a downstream end each having an outer surface;

a first flexible coupler having an outer surface and an inner surface, the first flexible coupler coupling the downstream end of the exhaust manifold and the upstream end of the first exhaust conduit such that a gap is retained between the downstream end of the exhaust manifold and the upstream end of the first exhaust conduit;

a first metallic coil coaxially aligned with the first flexible coupler, wherein the first flexible coupler biases the first metallic coil into contact with both the outer surface of the exhaust manifold and the outer surface of the first exhaust conduit;

a first clamp engaging the outer surface of the first flexible coupler such that the inner surface of the first flexible coupler sealingly engages with the outer surface of the exhaust manifold;

a second clamp engaging the outer surface of the first flexible coupler such that the inner surface of the first flexible coupler sealingly engages with the outer surface of the first exhaust conduit;

a second exhaust conduit that conveys the exhaust gas between the first exhaust conduit and the driveshaft housing, the second exhaust conduit having an upstream end with an outer surface;

a second flexible coupler having an outer surface and an inner surface, the second flexible coupler coupling the downstream end of the first exhaust conduit and the upstream end of the second exhaust conduit such that a gap is retained between the downstream end of the first exhaust conduit and the upstream end of the second exhaust conduit;

a second metallic coil coaxially aligned with the second flexible coupler, wherein the second flexible coupler biases the second metallic coil into contact with both the outer surface of the first exhaust conduit and the outer surface of the second exhaust conduit;

a third clamp engaging the outer surface of the second flexible coupler such that the inner surface of the second flexible coupler sealingly engages with the outer surface of the first exhaust conduit; and a fourth clamp engaging the outer surface of the second flexible coupler such that the inner surface of the second flexible coupler sealingly engages with the outer surface of the second exhaust conduit;

wherein the first metallic coil is configured such that when in contact with both the outer surface of the exhaust manifold and the outer surface of the first exhaust conduct, the first metallic coil shields the first flexible coupler from the exhaust gas and also conducts heat between the exhaust manifold and the first exhaust conduit; and wherein the second metallic coil is configured such that when in contact with both the outer surface of the first exhaust conduit and the outer surface of the second exhaust conduct, the second metallic coil shields the second flexible coupler from the exhaust gas and also conducts heat between the first exhaust conduit and the second exhaust conduit.

10. The exhaust system according to claim 9, wherein the first flexible coupler is made of seventy durometer silicone and wherein the first metallic coil is made of aluminum, wherein the first metallic coil has an upstream end and a downstream end that is opposite the upstream end, wherein the first metallic coil has an inner face and an outer face that is opposite the inner face, each extending from the first end to the second end and each extending from the upstream end to the downstream end.

11. The exhaust system according to claim 10, wherein the first metallic coil has a thickness of 0.76 mm between the inner face and the outer face and a height of 26.0 mm between the upstream end and the downstream end.

12. The exhaust system according to claim 9, and wherein the first metallic coil has an upstream end and a downstream end that is opposite the upstream end, wherein the first metallic coil has an inner face and an outer face that is opposite the inner face, each extending from the first end to the second end and each extending from the upstream end to the downstream end, and wherein the first flexible coupler further defines a pair of cavities within the radial channel such that the outer face of the upstream end and the outer face of the downstream end are prevented from contacting the inner surface of the first flexible coupler.

13. The exhaust system according to claim 9, wherein the first metallic coil has a first end and a second end that is opposite the first end, and wherein the first end slideably overlaps the second end such that a ring of variable circumference is formed.

14. The exhaust system according to claim 13, wherein the first flexible coupler defines a channel within the inner surface that is configured to retain the first metallic coil therein to prevent axial movement of the first metallic coil relative to the first flexible coupler.

15. The exhaust system according to claim 14, wherein the first metallic coil has an upstream end and a downstream end that is opposite the upstream end, wherein the first metallic coil has an inner face and an outer face that is opposite the inner face, each extending from the first end to the second end and each extending from the upstream end to the downstream end, wherein the first flexible coupler further defines a pair of cavities within the channel such that the outer face of the upstream end and the outer face of the downstream end are prevented from contacting the inner surface of the first flexible coupler.

* * * * *